(12) United States Patent
Pryor

(10) Patent No.: US 6,314,631 B1
(45) Date of Patent: Nov. 13, 2001

(54) VISION TARGET BASED ASSEMBLY

(75) Inventor: Timothy R. Pryor, Tecumseh (CA)

(73) Assignee: Great Lakes Intellectual Property, Winsdor (CA)

(*) Notice: Subject to any disclaimer, the term of this patent is extended or adjusted under 35 U.S.C. 154(b) by 0 days.

(21) Appl. No.: 08/465,257

(22) Filed: Jun. 5, 1995

Related U.S. Application Data

(62) Division of application No. 07/875,282, filed on Apr. 29, 1992, which is a continuation of application No. 07/478,078, filed on Feb. 9, 1990, now Pat. No. 5,148,591, which is a continuation of application No. 07/110,541, filed on Oct. 20, 1987, now abandoned, which is a continuation of application No. 06/865,637, filed on May 14, 1986, now abandoned, which is a continuation of application No. 06/660,280, filed on Oct. 12, 1984, now abandoned, and a continuation-in-part of application No. 06/651,325, filed on Sep. 17, 1984, now Pat. No. 4,769,700, and a continuation-in-part of application No. 06/592,443, filed on Mar. 22, 1984, now Pat. No. 4,602,163, which is a continuation-in-part of application No. 06/348,803, filed on Feb. 16, 1982, now abandoned, which is a continuation-in-part of application No. 06/453,910, filed on Dec. 28, 1982, now abandoned, and a continuation-in-part of application No. 06/323,395, filed on Nov. 20, 1981, now Pat. No. 4,482,960, which is a continuation-in-part of application No. 06/262,492, filed on May 11, 1981, now Pat. No. 4,453,085.

(51) Int. Cl.$^7$ .................................................. B23Q 17/00
(52) U.S. Cl. ........................ 29/407.04; 29/407.1; 382/291
(58) Field of Search ............................ 29/407.04, 407.1, 29/720, 721; 250/339.06, 339.14, 341.8; 382/152, 288, 289, 286, 291; 356/375

(56) References Cited

U.S. PATENT DOCUMENTS

| 3,451,254 | * | 6/1969 | Maley | 250/339.14 |
| 4,014,000 |   | 3/1977 | Uno et al. | |
| 4,040,744 | * | 8/1977 | Schertz et al. | 250/339.14 X |
| 4,044,377 | * | 8/1977 | Bowerman | 901/47 X |
| 4,146,924 | * | 3/1979 | Birk et al. | 364/513 |
| 4,190,890 | * | 2/1980 | Marx | 29/720 X |
| 4,219,847 | * | 8/1980 | Pinkney et al. | 901/47 X |

(List continued on next page.)

FOREIGN PATENT DOCUMENTS

| 2430058 | * | 1/1976 | (DE) | 901/47 |
| 114505 | * | 8/1984 | (EP) | 901/9 |
| 0219537 | * | 9/1986 | (JP) | 29/720 |
| 0229252 | * | 9/1988 | (JP) | 29/720 |

OTHER PUBLICATIONS

Bales et al., "Marking Parts to Aid Robot Vision", NASA Technical Paper 1819, Apr. 1981.*

IBM Technical Disclosure Bulletin, vol. 27 No. 6, Nov. 1984, pp. 3653–3655, M.S. Chester, M.A. Lovin, R.H. Taylor, "Chip–Placement Alignment Technique", copy available in class 29 subclass 833.*

(List continued on next page.)

Primary Examiner—David P. Bryant
(74) Attorney, Agent, or Firm—Larson & Taylor PLC

(57) ABSTRACT

Methods for assembling, handling, and fabricating are disclosed in which targets used on objects are located. The targets can be specifically applied to the object, or can be an otherwise normal feature of the object. Conveniently, the targets are removable from the object or covered by another object during an assembling process. One or more robots and imaging devices for the targets, especially for infrared radiation, are used. The robots can be used to handle or assemble a part, or a fixture may be used in conjunction with the robots. Conveniently, the CAD design system is used in designing the targets as well as for the assembly process using the targets. A plurality of targets can also be used to monitor and inspect a forming process such as on a sheet panel.

6 Claims, 24 Drawing Sheets

U.S. PATENT DOCUMENTS

| | | | |
|---|---|---|---|
| 4,314,402 | * | 2/1982 | Lemmer .............................. 29/833 X |
| 4,380,696 | * | 4/1983 | Masaki ................................ 901/9 X |
| 4,396,945 | * | 8/1983 | DiMatteo ........................... 901/47 X |
| 4,402,053 | * | 8/1983 | Kelley et al. ...................... 901/47 X |
| 4,412,121 | * | 10/1983 | Kremers et al. ................... 901/47 X |
| 4,435,835 | | 3/1984 | Sakow et al. . |
| 4,475,122 | | 10/1984 | Green . |
| 4,613,942 | * | 9/1986 | Chen ................................. 901/47 X |
| 4,631,676 | | 12/1986 | Pugh . |
| 4,639,878 | * | 1/1987 | Day et al. .......................... 901/47 X |
| 4,670,298 | * | 6/1987 | Lucas et al. ....................... 29/840 X |
| 5,485,012 | * | 1/1996 | Liebson ........................... 250/339.06 |

OTHER PUBLICATIONS

Decade of Robots 1983, pp 30–33, Yoon Yong, Maurice Bonner, "Simulation: Preventing Some Nasty Snarl ups", copy class 901, subclass 6.*

Merritt, "Industrial Robots: Getting Smarter All The Time", Instruments & Control Systems, Jul. 1982, pp. 32–38.*

Hollingum, "Robots that See, Feel and Sense", The Engineer, Nov. 1980, pp. 45, 48.*

Ruoff, "PACS–An Advanced Multitasking Robot System", The Industrial Robot, Jun. 1980, pp. 87–98.*

* cited by examiner

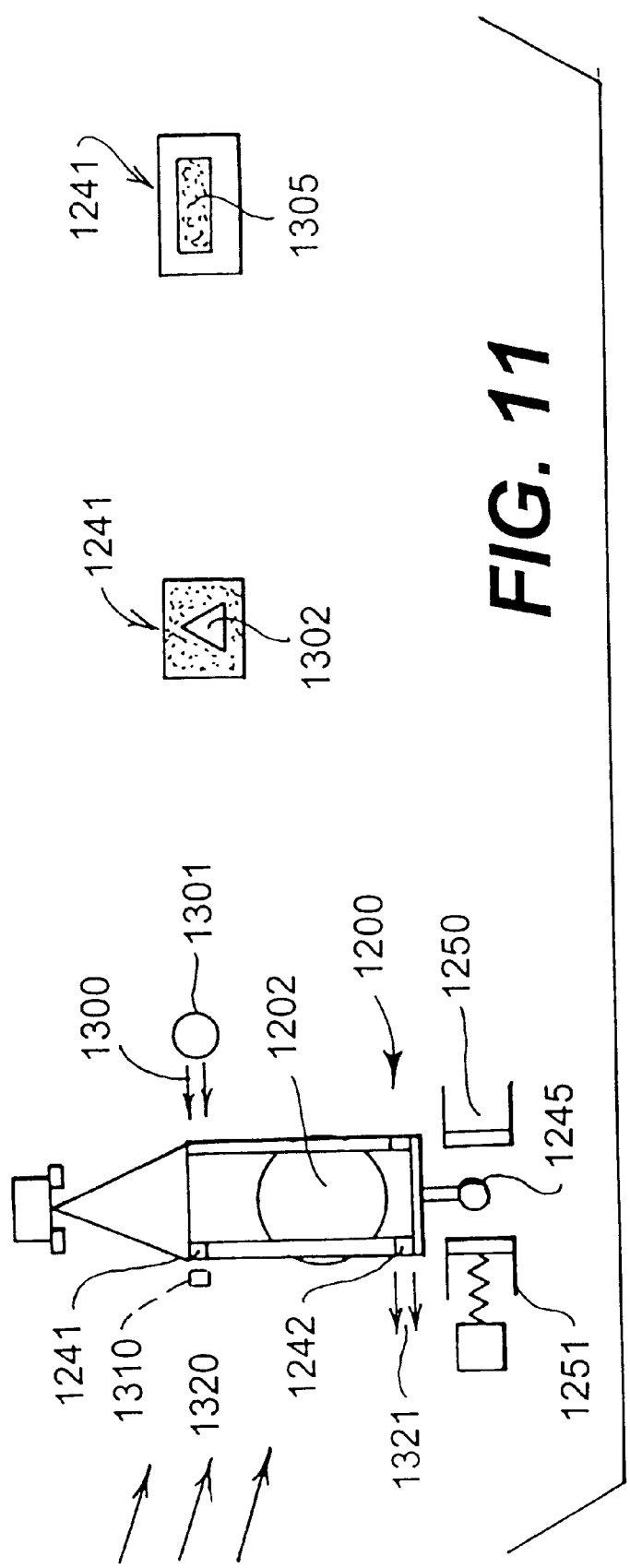

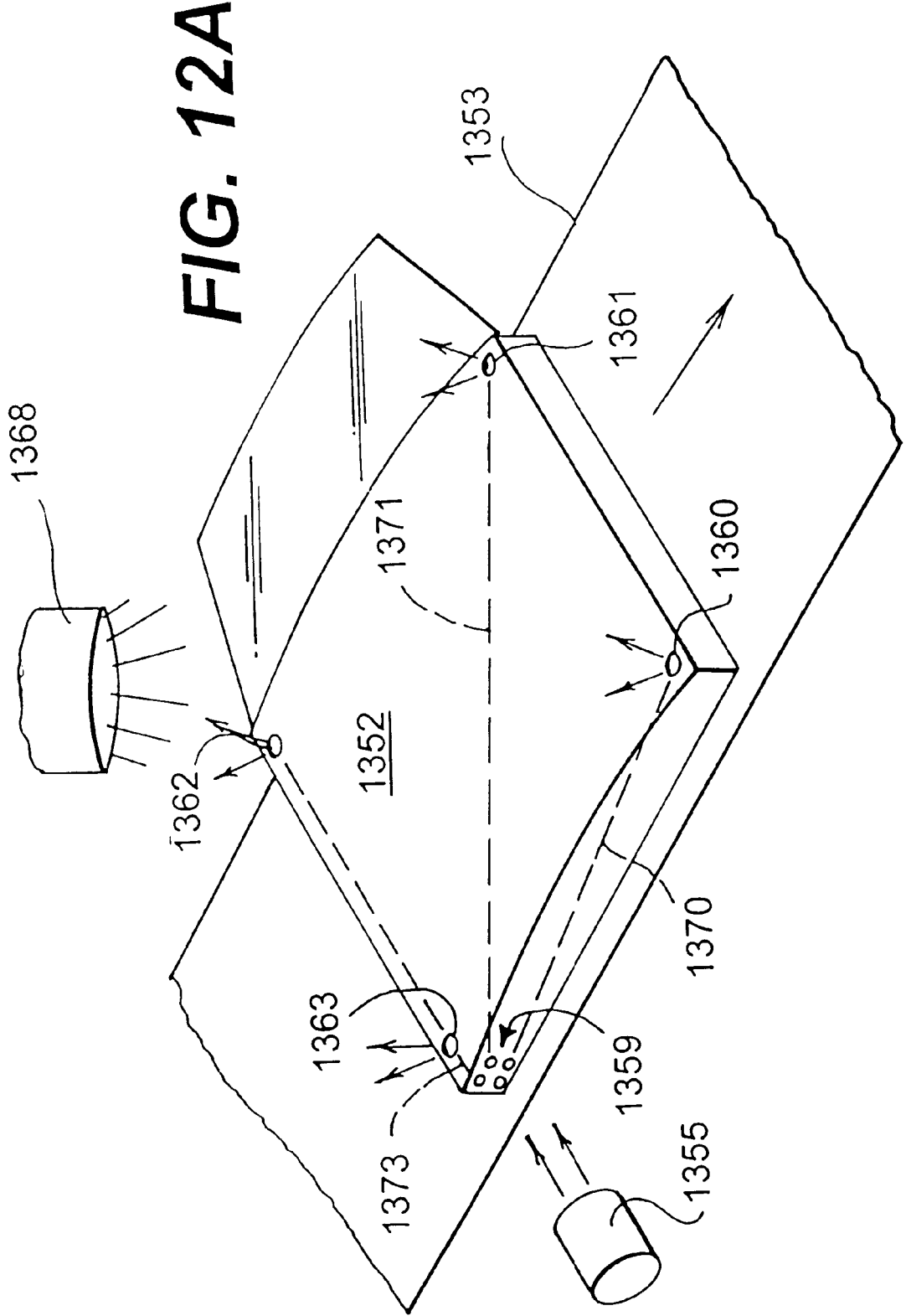

VISION TARGET BASED ASSEMBLY

This application is a division of application Ser. No. 07/875,282 filed Apr. 29, 1992 which was a continuation of application Ser. No. 07/478,078, filed Feb. 9, 1990, now U.S. Pat. No. 5,148,591, which was a continuation of application Ser. No. 07/110,541, filed Oct. 20, 1987, now abandoned, which was a continuation of application Ser. No. 06/865,637, filed May 14, 1986, now abandoned, which was a continuation of application Ser. No. 06/660,280, filed Oct. 12, 1984, now abandoned, which was a continuation-in-part of application Ser. No. 06/348,803, filed Feb. 16, 1982, now abandoned, and a continuation-in-part of application Ser. No. 06/453,910, filed Dec. 28, 1982, now abandoned, and a continuation-in-part of application Ser. No. 06/323,395, filed Nov. 20, 1981, now U.S. Pat. No. 4,482,960, and a continuation-in-part of application Ser. No. 06/651,325, filed Sep. 17, 1984, now U.S. Pat. No. 4,769,700, and a continuation-in-part of application Ser. No. 06/592,443, filed Mar. 22, 1984, now U.S. Pat. No. 4,602,163, which was a continuation-in-part of application Ser. No. 06/262,492, filed May 11, 1981, now U.S. Pat. No. 4,453,085.

BACKGROUND OF THE INVENTION

The following are co-pending applications in the same field showing the state of the art which are herein incorporated by reference:

1. Robot Calibration, Ser. No. 06/453,910, now abandoned.
2. Electro-Optical Systems for Control of Robots, Manipulator Arms and Coordinate Measuring Machines, or "Robots and Manipulator Arms", Ser. No. 592,443, filed Mar. 22, 1984, now U.S. Pat. No. 4,602,163.
3. Robot Tractors Ser. No. 06/323,395, now U.S. Pat. No. 4,482,960.
4. Robot Tractors, Vehicles and Machinery, Ser. No. 651,325, filed Sep. 17, 1984, now U.S. Pat. No. 4,769,700.
5. Electro-optical sensor systems for thread and hole inspection Ser. No. 06/064,867, now U.S. Pat. No. 4,315,688.
6. Method and apparatus electro-optically determining the dimension, attitude and location of objects: Ser. No. 06/034,278.
7. Method and apparatus for determining physical characteristics of object and object surfaces: Ser. No. 06/015,792, now U.S. Pat. No. 4,373,804.
8. New photodetector array based optical measurement systems: Ser. No. 06/163,290, now U.S. Pat. No. 4,394,683.
9. Electro-optical inspection, Ser. No. 06/073,226, now abandoned.
10. Co-ordinate measuring method and device, Ser. No. 06/201,081, now abandoned.
11. Electro-optical sensors with fiber optic bundles, Ser. No. 06/173,370, now U.S. Pat. No. 4,441,817.
12. Electro-optical surface roughness measurement and control Ser. No. 06/240,459, now abandoned.
13. Apparatus for determining dimensions, Ser. No. 06/134,465, now U.S. Pat. No. 4,403,860.
14. High speed electrooptical inspection, Ser. No. 06/203,866, now abandoned.
15. Fiber optic based robot controls, Ser. No. 06/200,401, now U.S. Pat. No. 4,460,826.
16. Electro-optical sensors for machine tool and robotic inspection, Ser. No. 06/247,399, now abandoned.
17. Electro-optical systems for control of robots, manipulator arms and coordinate measurement machines Ser. No. 06/262,497, now U.S. Pat. No. 4,453,085.
18. Method and apparatus for determining wear or breakage of tools and other defects, Ser. No. 06/323,397, now U.S. Pat. No. 4,420,253.
19. Electro-optical systems for detection of leakage and blockage, Ser. No. 06/323,399, now abandoned.

Flexible robot assembly is often very difficult in the absence of machine vision sensors to guide the operation. Even with such sensors, operation must be both accurate, ultra reliable, and fast enough to be justifiable relative to human labor. These criteria are seldom met by present day vision systems employing arbitrary gray level images and the like.

The target based invention described in reference 1 above has wide application to the assembly process. Described therein are several embodiments illustrating target based techniques which can overcome the limitations of present systems. The key to the use of the disclosed systems is that the target points on the part are easily discernable and unambiguous, after processing using rapid devices and other high speed analysis software.

The target system functions well because it is based on high contrast images and mathematical equations. To use targets one must know the part feature data base relative to the target points on the part. Targets on tooling, pallets and fixed members may also be of use. Special retro reflective targets give best contrast, but targets can be holes, corners or other easily determined natural part features.

Finally, where special targets are used which would not normally be present, techniques are disclosed to make these unobtrusive.

SUMMARY OF THE INVENTION

In accordance with the present invention, a method for controlling an assembly process is provided in which at least one first robot holds a first part in relation to a second part. Targets are provided on at least one of the robots or the first or second part. A TV camera then determines the position of the targets. From this determination, the assembly process is controlled.

In a preferred embodiment, the part held by the robot has a face on which the targets are located such that the TV camera can view these targets. In this manner, the robot is guided to handle or assemble the part.

A method for fabrication or assembly in which a fixture is provided is also disclosed. The location of a part having targets is determined with a TV camera and a robot then places the part on the fixture depending upon this determined location. A further object may be located on the fixture.

During a dynamic fabrication, it is also possible with the present invention to target the part so that corrections can be made during processing.

Preferably, the targets are located in a finished assembly in such a manner as to be out of view. These targets can be covered up by a second object assembled with respect to the first object if applicable.

The present invention also includes a method for guiding objects into openings or onto protrusions. A plurality of target features are initially provided adjacent an opening or protrusion. These target features are imaged with a TV camera in order to determine the location of the target features. From this determined target location, an object is guided onto the opening or protrusion.

The present invention also makes use of a CAD system in a method of fabrication. Initially, the design of a finished assembly of parts is provided in a CAD system. The CAD system is also provided with individual part designs which are used to make up the assembly. These designs include special targets or natural features which serve as targets. The entire system is then provided with a logical progression of functions feeding programmfunctions to one or more robotic automation devices for assembly. Assembly is assisted by the use of TV cameras which are provided with the design data. The parts are then suitably assembled using images of the targets determined by the camera. Initially, the CAD system can be used to simulate the fabrication process.

In another preferred embodiment of the present invention, targets are provided on an object before a forming operation is performed. The location of the targets after forming are then determined. From this determined location, the attitude, shape, or dimension of the object or portions thereof are also determined. Depending upon the determined data, the handling, assembling, inspecting, or working the object is then effected.

This invention further relates to methods and apparatus for determining the position of an object and guiding robots or other automation to handle or work on said object.

There are many instances in which it is desired to know the position of an object. In the manufacturing field, such instances include the position of objects along mass production lines, particularly those which are highly automated. For example, in a mass production line, it is frequently necessary to know with considerable precision the position of an object suspended from a conveyor system. This is particularly true in automated systems involving the use of robots for it is fundamentally necessary that the object be in a known position, relative to the robot, before the robot can execute a desired manipulation of the object.

In some instances, mechanical means are used to position the object and/or to orient the object in proper position for automated manipulation. For many applications, however, it is necessary to provide "vision" in order to determine the position of an object. This is particularly true in the case of robots which can perform a myriad of physical manipulations, all automatically. It is well recognized in the field of robots that robotic "vision" is one of the major obstacles to much wider use of robots which are presently quite sophisticated in terms of the manipulations of which they are capable.

Specifically the problem in plants of operationally using robots to handle or work on random parts on continuous conveyors is an enormous one. Since such conveyors are omni present in plants of all types, this problem must be effectively dealt with, if large scale robot usage is to become a reality.

In doing so, there are many types of electro-optically based "machine vision" systems which can be utilized. Historically, these systems have been based on reflective viewing of objects through their gray scale levels which poses extremely difficult problems. The trend is thence to ever more complex systems, which runs counter to good plant reliability.

This inventor, for example, has been involved in the installation of nearly 1,000 electro-optical sensor units in plants of varying types for inspection. Substantial difficulties have been encountered when such electro-optical image based sensors were utilized to obtain part images, particularly in reflection.

When one considers that the robot based system must achieve a reliability far higher than even these inspection based units, in order that it not ruin the product, drop it on the floor etc., it becomes apparent that a simple and reliable means of solving these problems is required.

This invention seeks to illustrate such means. In particular, solution is possible if one restricts the problem simply enough to targeted objects. This then leads to the possibility of tracking the parts or the containers, conveyors etc. so targeted, possibly using further sensors if required to find parts within these containers, instrumented grippers or the like.

The application by the inventor, Ser. No. 200,401, illustrated in the embodiment of FIG. 13, instrumented monorail and walking beam conveyors utilizing fiber optics directed through portions of the conveyor apparatus which could be illuminated on demand in order to provide one or more targets for tracking or homing purposes using robotic or other automation.

Also described in Ser. No. 200,401 are many other novel features of interest.

These are:

(a) The general concept of use of such 'active' lighting in automation and particularly the use of fibers therefore.

(b) The use of 'active detection' wherein the light is directed from the robot into one end of a fiber, and sensed at the opposite end of said fiber.

(c) The use of other materials than fibers, for example, translucent fixtures of Teflon or ceramic.

(d) The use of multiple target points on the illuminated piece to be tracked.

(e) The use of blow-offs to keep the targeted fixtures clean.

(f) The use of pulsed or modulated light sources discrimination against background noise.

(g) The use of light sources and electro-optical sensors both located on robot where the light source of the robot is directed to a predicted entrance point of the fiber(s) and the light emanating from the opposite end of the fiber(s) is sensed by the camera of the robot. Two robots for example could be used, one to light the part or fixture, the other to sense it.

In addition, the application described how to track conveyors carrying parts and made reference to the tracking the parts themselves.

It is an object of the present invention to provide a method and apparatus for determining the position of a targeted object or object carrier. It is a further object of the invention to provide such method and apparatus having particular suitability for providing robotic "vision" and to disclose practical system based thereon.

It is further intent of this invention to expand the previously disclosed concepts beyond simply the fixtures themselves and the parts within the fixture, to the targeting and identifying of containers and parts of all descriptions, for example to baskets, trays, cartons, tools for pickup, parts in warehouse bins, and indeed the parts themselves.

In addition, this invention elaborates further on the use of other targeting materials than fiber optics, not only transmissive materials of other sorts, but objects such as glass beads, drilled fascets, casting risers and the like.

It is a further purpose of this invention to show other means in the sensing which can give improved target position and data. Particularly of interest are those related to apparatus such as Pinkney, U.S. Pat. No. 4,219,847.

It is further a purpose of this invention to show specifically how certain parts in overhead monorail conveyors can be picked off under random situations with the high reliability needed to work in plants.

It is further a purpose of this invention to show means for outlining the edges of targets for use with stereo cameras or other sensing means not necessarily based on point targets.

It is a further purpose of this invention to show means for coding the various fiber input or outputs, or other targets by use of colors or modulation frequencies. This is also possible with inserted glass beads and retro-reflectors.

Finally, it is a desirable purpose of this invention to show that standardized systems, based on such tracking, can be used across the total spectrum of manufacturing and industry with very little change as long as one sticks to certain target principles. This allows the wide spread use of reliable guide robots at affordable cost.

Other features and advantages of the present invention are stated or apparent from a detailed description of presently preferred embodiments of the invention found hereinbelow.

BRIEF DESCRIPTION OF THE DRAWINGS

FIGS. 3a and 3b schematically illustrate a dual robot version of the invention, with specialized target concepts including targets on two sides of parts, on end effectors and the like.

FIG. 11 illustrates target embodiments on the carriers used in FIGS. 10A, 10B.

FIGS. 12A, 12B illustrates an embodiment showing methods of targeting a plastic door panel having built-in optical fibers.

FIG. 16 illustrates a part targeting embodiment wherein said targets comprise directional or color reflective elements which may be molded or pressed in.

DETAILED DESCRIPTION OF THE PREFERRED EMBODIMENTS

Figure 1:
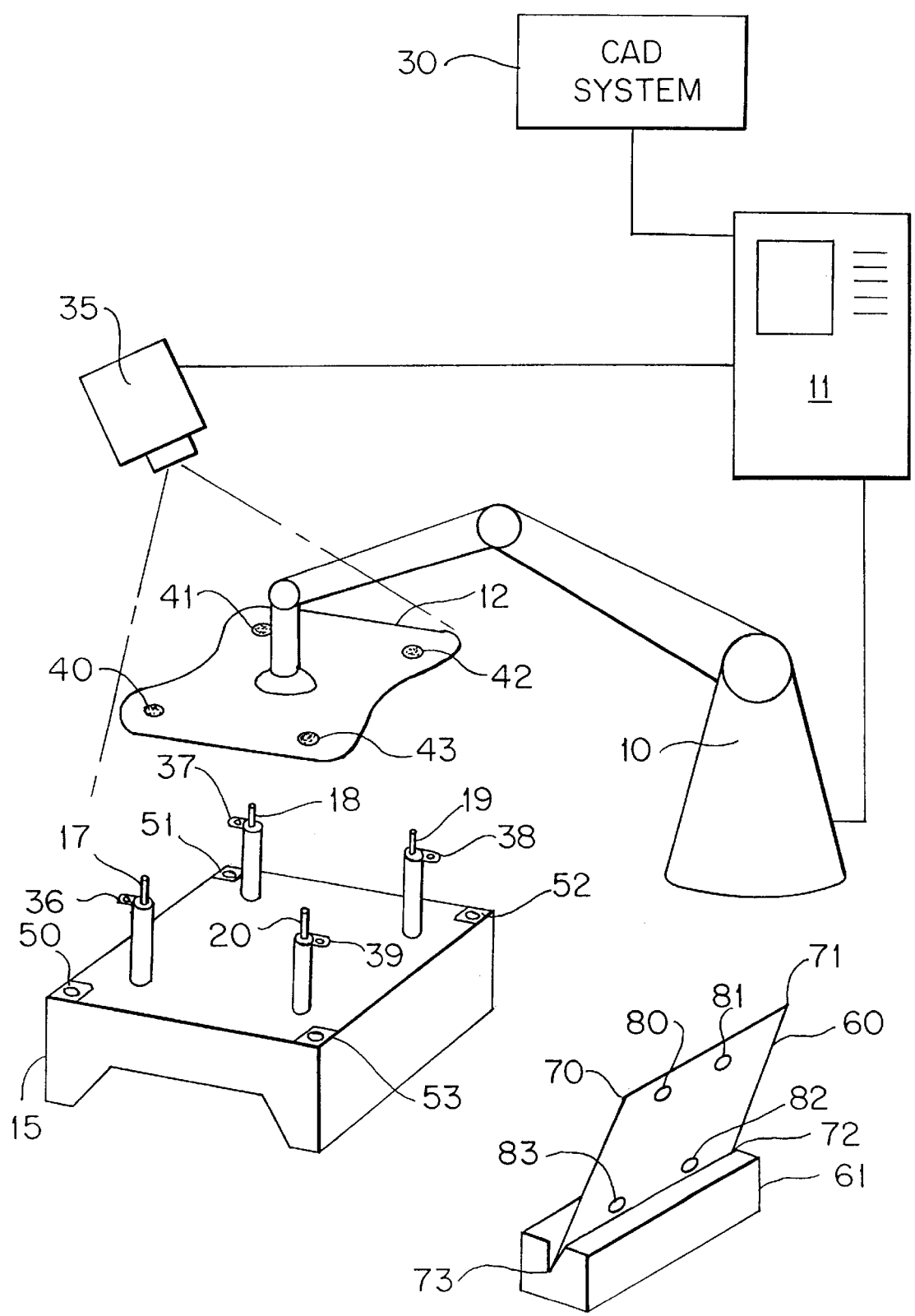
FIG. 1 schematically illustrates a targeted assembly fixture with part loading by a robot.

FIG. 1 illustrates an assembly operation using a robot 10 with a control computer 11 to place a part 12 of a car on an assembly fixture 15 which has been targeted according to the invention. As is desirable, the CAD system 30 (which has created the design for both the part and/or the fixture) has recorded the target data points 40, 41, 42 and 43 that are to be used by a camera unit 35 to locate the part 12 and/or the features of the part 12 that have been designated as targets plus the target points of the assembly fixture. It is noted that in some cases assembly fixtures are not required as pointed out below. When this data is obtained, the CAO system 30 downloads to the robot control 11 the description of the target point locations and the robot then homes in on these points using the present invention.

In a typical example, a hood inner support is part 12. Part 12 is loaded in a programmable manner from the download data onto locators 17, 18, 19 and 20 on a fixture 15 where targets 35, 37, 38 and 39 have been placed. Targets 36, 37, 38 and 39 are either on or near the locators 17, 18, 19 and 20, or on points 50, 51, 52 and 53 around the framework of the fixture 15 which are related to the locators 17, 18, 19 and 20. The camera system 35 located on the robot (or alternatively off the robot as shown) locates these points and guides the robot 10 in. Differential dosing data between part and locators can be provided to allow a smooth close and mate operation.

To assemble hood outer panel 60 to the inner part 12, adhesive for example, is first applied to hood inner part 12. The adhesive is conveniently applied using the same robot 10 and using the fixture or part target data to guide the robot 10 (although once the part 12 is well-located on the fixture 15, it is known accurately enough in position to not require additional vision sensing except as a verification check).

The robot 10 goes and gets the hood outer panel located in rack 61 using either of two methods. First, it can locate the hood by its corner edges 70, 71, 72 and 73 as target points, grasp the outer panel 60 with a suction cup, and place it on the inner support part 12.

Another method is that the robot 10 grasps the panel 60 arbitrarily at the best estimated location on its outer surface. The robot 12 then presents the rear of the surface of panel 60 having holes 80, 81, 82, 83 to camera 35. Camera 35 then establishes the part reference to the robot so that the hood outer panel 60 can be reliably placed over the inner part 12 and joined.

Figure 2:
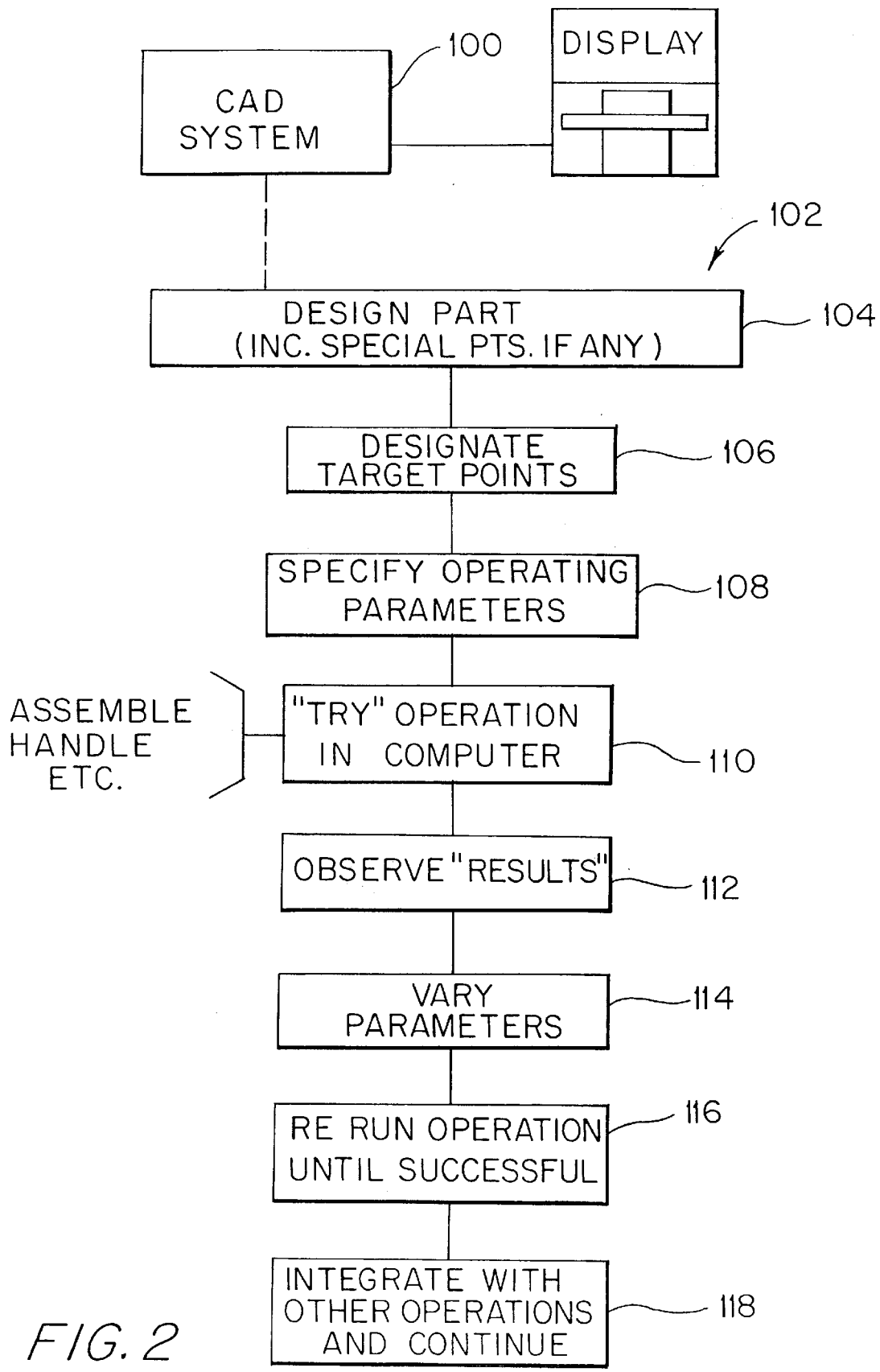
FIG. 2 is a simulation block diagram.

The fixture design and the target relationships to the part design can be optimally matched in the design computer 100 as shown in FIG. 2. This allows a simulation routine 102 of the whole process at a point before construction. Unlike other hypothesized robot simulation activities, this one is based on the sure knowledge that the target points will be identifiable within any given practical accuracy range because only highly well defined targets are utilized which are at sufficiently precise locations to the data bases of the part or fixture to assure success.

As shown in FIG. 2, simulation routine 102 begins with design part box 104 which takes account of the design data of the part, including any special points (if any). Next, from this data, target points are designated on the part as shown in box 106. The operational parameters are then specified as indicated by box 108. These parameters include camera-processor types, type of robot(s), distances, range of possible orientations, tracking algorithms used, photogrammetric algorithms used, special target indicators, and the like. Using the operational parameters selected, an operation such as assembling or handling is tried as shown by box 110. The results of this "try" are then determined as indicated by box 112. These results are such things as cycle time, functionality, etc. Depending on the results obtained, various parameters are varied in an effort to improve the process as shown by box 114. Among the parameters which might be varied are the following: change equations, redesign part, change target points, apply special targets, add light sources, and add front end processor.

After the appropriate parameters are varied, the operation is again tried as indicated by box 116. If not successful, the parameters are again varied and the operation rerun until a successful operation is achieved. At this point, the operation is ready to be integrated with other operations as indicated by box 118. It should be noted that CAD system 100 would have ideally programmed the parameter (speed, accuracy, risk etc.) of various target choices to be seen using various camera lighting, image processing, and the like.

In addition, simulation 102 can continually optimize the solutions of the photogrammetric target equations to allow the best performance accuracies to be obtained within the desired cycle time of the operation. For example, the target choice and location, number of targets etc., can be changed on a CAD system and operation of the process using robots interacting with these targets simulated and photogrammetric and/or tracking equations optimized.

A simulation block diagram is shown in FIG. 2. With the system, it becomes cost effective to develop simulation programs for robot systems since one has an assurety of vision based guidance. This is not true with other guidance systems in operation today, and particularly not so with those capable of the high speed accurate operation required to justify cost in modern manufacturing.

Figure 3A:
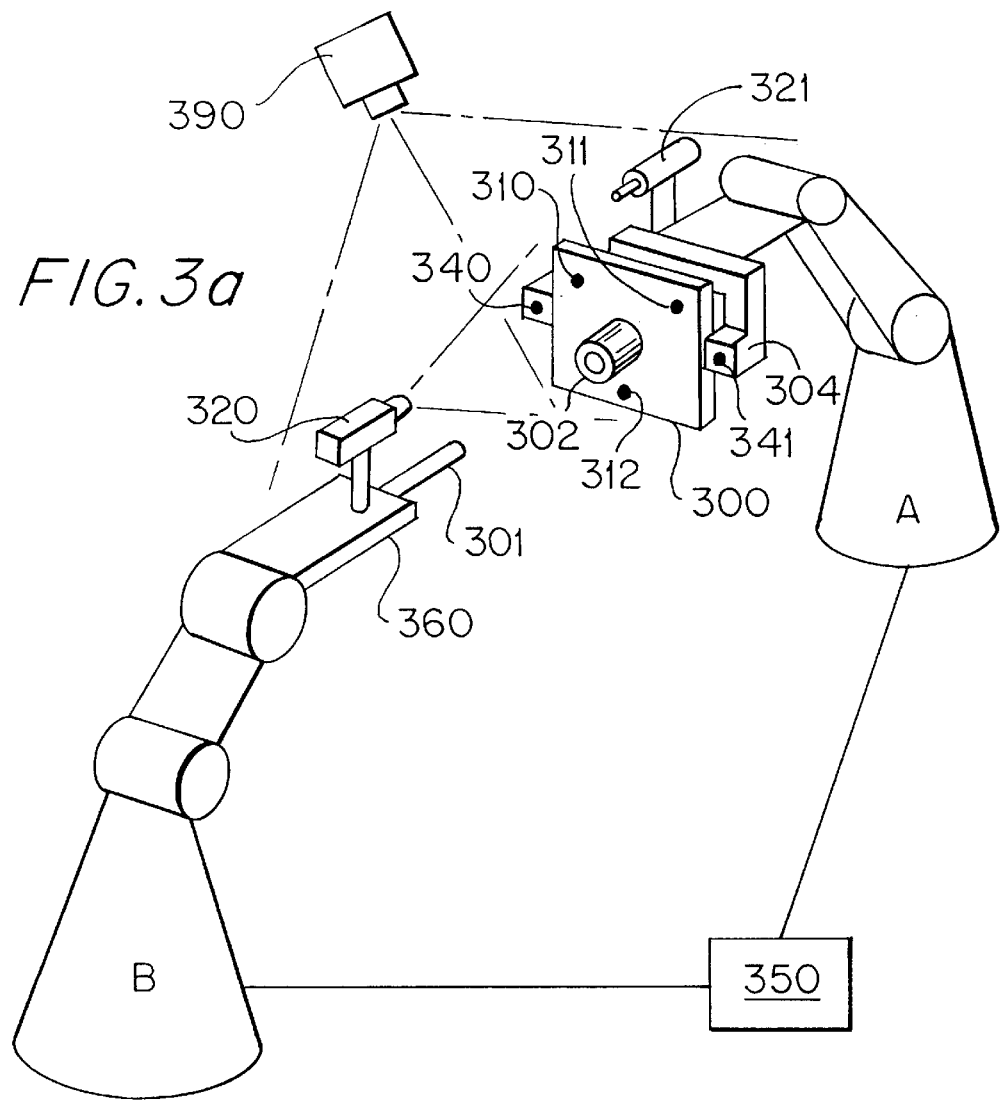

FIG. 3a illustrates a variation on this particular embodiment in which a dual set of robots is used. In this case, Robot A picks up the part 300 and presents it to Robot B which then inserts a shaft part 301 into a sleeve 302 in part 300. This assembly operation could be any other type of operation as well.

Part 300 is picked up by the robot gripper 304, preferably, but not necessarily, using target points 310, 311, and 312 on part 300 viewed by camera 321. When it is presented to part 301, the second robot can interact in any one of several ways. In the first case, the part 300 has target points that can be identified such as holes or other purposely placed targets that can be identified relative to it. In this case, the camera unit 320 on Robot B can home in on those points. Again, as before, all of this data can be downloaded from a central computer 350.

Another possibility is to target the Robot A end effector or tooling 304 holding the part 300, as shown with targets 340 and 341. Since part 300 has been picked up originally in an accurate manner relative to the tooling 304, the tooling 304 then can act as the data base to provide the target data points for the second Robot B. This is particularly true since these target data points can be idealized targets comprising retro reflective material or active fiber illumination which are almost perfect in the ability to be accurately judged. Thus, minimal stackup error due to this transfer of location data occurs.

It is noted that the camera 321 on Robot A can "home-in" on targeted tooling plate 360 on Robot B having 3 targets as shown while the camera on Robot B can look at tooling 304 on robot A. Each one can thus home in on the other.

Figure 3B:
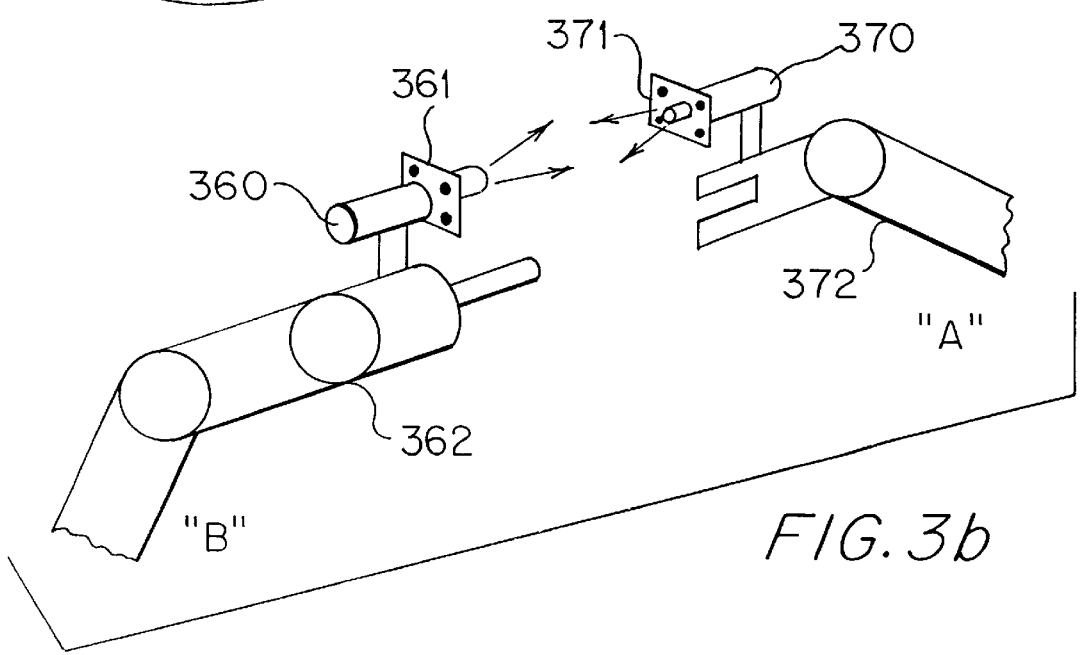

This ability of Robots A and B to look at each other is illustrated in FIG. 3b. A targeted plate 361 surrounding camera 360 is attached to robot arm 362, while a similar targeted plate 371 is adjacent camera 370 on robot arm 372.

Note that robot arm 372 could, for example, be instead a fixed structure such as a drill or router unit with camera 360 (or 370) homing the robot arm 362 in on it with a part in its gripper using targeted plate 371 (or 361).

A third possibility is to target both robots in a manner visible from above (or elsewhere) and use an overhead camera system 390 to monitor the closing target conditions of one to the other. This is schematically shown in FIG. 3a.

Another version is a front/back target situation where control transfer is made between target sets on a part. A part can be picked up (say by robot A) based on targets on one side, and presented to a camera on robot B whose camera locks in on targets on the other side.

Figure 4A:
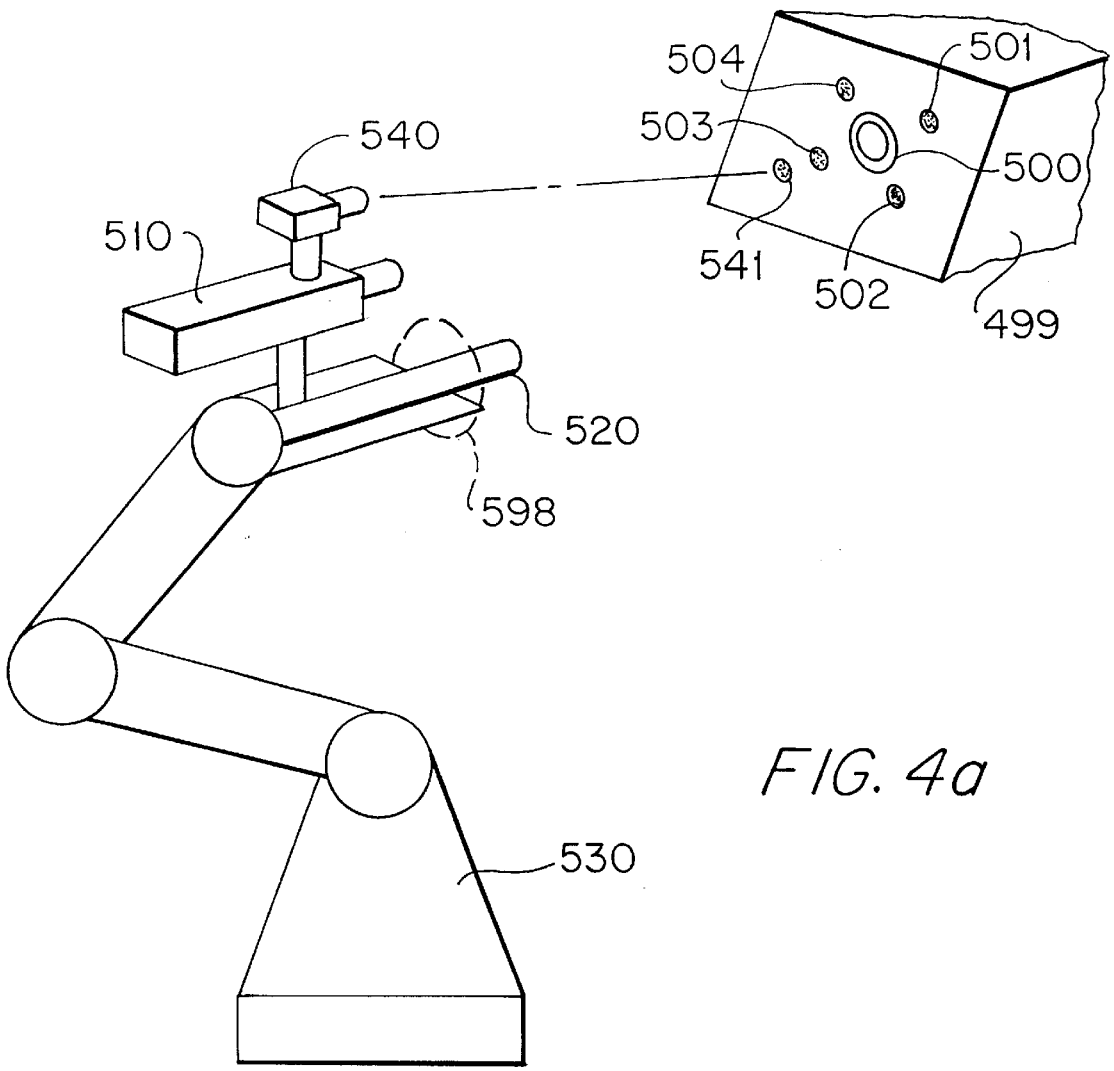
FIGS. 4a and 4b schematically illustrate, respectively, an assembly technique using targets which surround an opening and targets which are covered up by other parts or assembled to point the targets away from view.

FIG. 4a illustrates a robotic arrangement for putting parts into holes or other openings. The area around the hole 500 in part 499 is targeted with targets 501, 502, 503 and 504. Typically 3 or more targets are utilized to allow the total 6 degree of freedom approach to the holes to be made. In this example, the camera 510 on robot 530 senses the target points 501, 502, 503 and 504, and knowing their locational relationships to the hole 500 and its centerline, guides the part 520 such as a pin into hole 500.

TV camera 510 can be located on the robot arm, or elsewhere. The camera sensor unit may also be augmented by triangulation sensors using a diode laser or other light source 540 to project the laser spot 541 or other zones onto the part to further aid the guidance. Such spots or zones can also be viewed by the same camera 510.

The targets around the hole can be anything suitable. For example, on a cast iron block or a cast aluminum block, these can be cast in indentations, raised areas, etc. perhaps with special signatures (e.g triangles, stars, etc.) to allow their easy acquisition. A variety of other possibilities are also in order. The lighting for such targets is usually provided by a source on the robot arm although the maximum contrast, indented, or raised targets should be sometimes lit at an angle (see copending application reference 1 on lighting for robot applications.)

The particular opening can be any opening, not just a hole. For example, the points at which a gas tank lid is to be placed onto the side of a car rear quarter panel could be used. In this case, the target points might be painted onto the body side outer surface, or other inner points, which would be covered up by the lid.

In this general case, the target points on the surface are covered up after the part is assembled on the shaft by the part. This way they are removed from aesthetic considerations. There are numerous examples where the object involved can be used to cover up the target points that were first used to find the 6 degree of freedom or multi degree of freedom location of the object.

For example, consider FIG. 4a where the part could be a radio knob with a disc 598 (dotted lines) on a shaft 520. When assembled into hole 501 in dashboard 499, disc 598 covers up targets 500–504.

It is noted that hole 500 in FIG. 4a could also be a protrusion like a shaft, stud, etc., assembly to which also requires multi degree of freedom guidance.

Figure 4B:
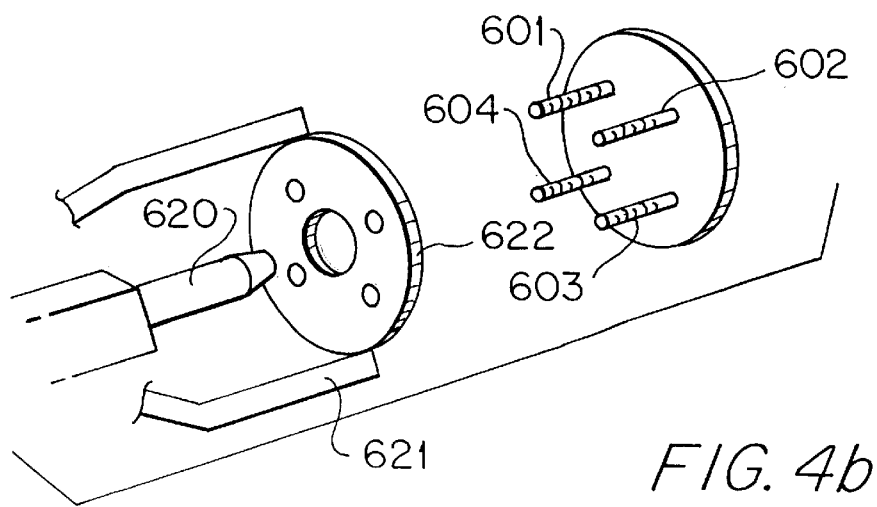

Target points can be located on the end of protruding objects as well. For example, it is often necessary to insert something with multiple holes onto multiple pins (or vice versa). This is the case of wheel bolts on a car. In this case, illustrated in FIG. 4b, the targets are the ends of the wheel bolts 601, 602, 603 and 604 which are suitably targeted according to the invention, for example, with reflective paint. Conveniently, the camera 620 can be mounted in the tooling 621 holding the wheel 622 so as to look through the wheel at the bolt ends.

Another example of targets which can be camouflaged is the use of targets on the back side of an object as was illustrated in FIG. 1. In this case, it is desired for example to assemble a part which has been targeted for ease of manipulation to another part. The targets in this case are purposely chosen to be on the inside when the assembly is complete.

For example, let us consider a process where a robot utilized for assembling a house is used. The robot picks up targeted board lumber which is targeted on its back face with the target points, or what will be the back face in the home. The back face is then presented by this first robot to a second robot which nails the board to other boards that have already been assembled. The assembly is done in such a manner that the target points that have been used are mounted on the inside. Indeed, this works out quite well since the robot can also look at target points on the outside of the rest of the structure and determine from them the location to place this first part over same. As the structure is totally assembled, all targets end up pointing inside (or are covered up). This allows the use of such targets without creating aesthetic problems on the outside.

This coverup was shown relative to the ratio knob in FIG. 4a but also would be the case here on the inside where one would cover it up later with wallboard.

Figure 5:
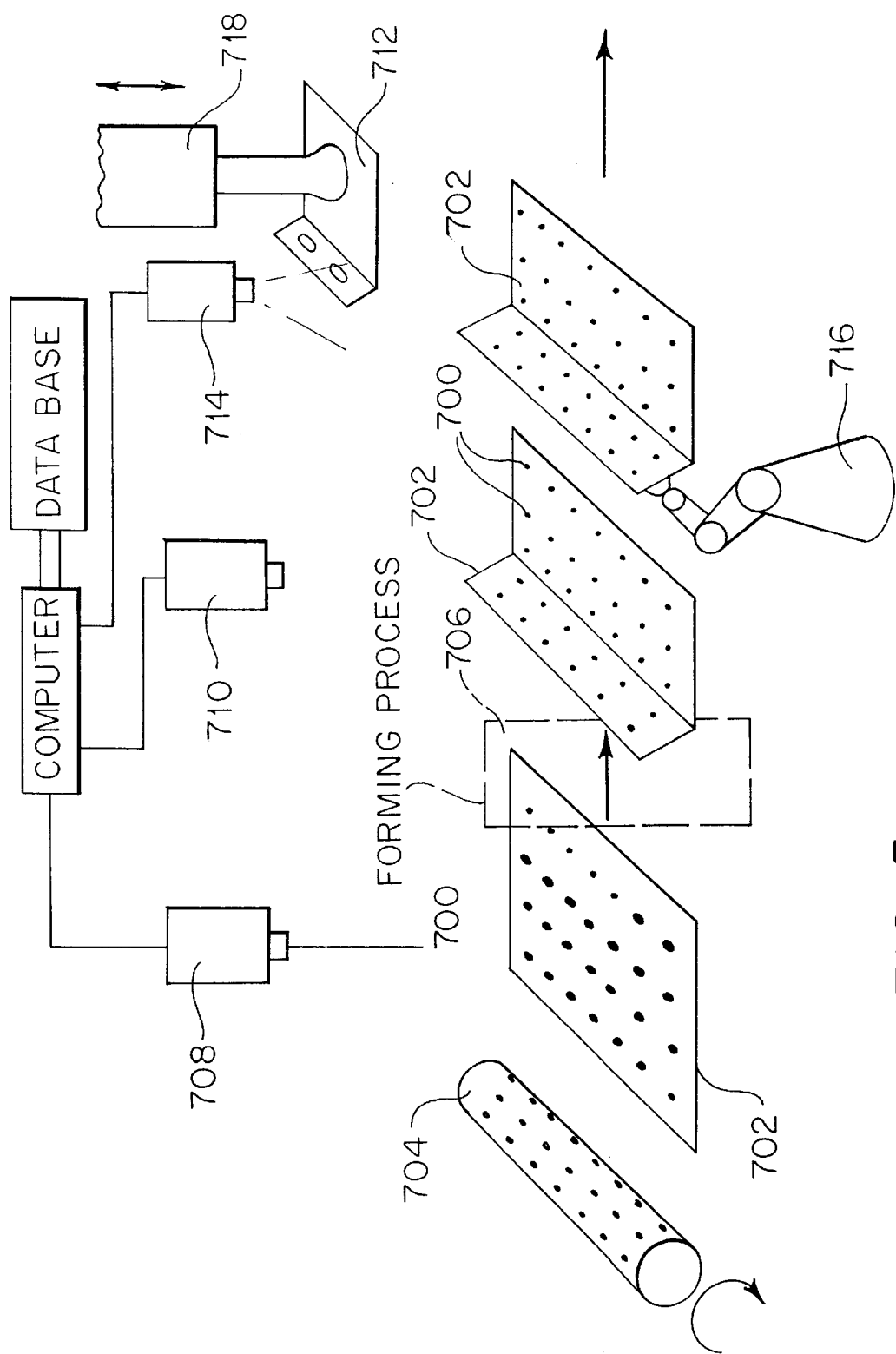
FIG. 5 schematically illustrates transformation of target data bases due to forming.

Consider now FIG. 5 which illustrates the use of target points 700 all over a structure 702 and particularly on formed parts. The intent here is twofold. The first is to deduce from the changes in the target pattern the effects of forming on the part 702. For example, it may be desired to obtain the new dimensional shape of the part 702 using the data base now resulting from the forming process 706 and any strains or any in-plane deflections which may have occurred as a result of the forming or welding process, etc. This can be used to control the process 706 as well as feed data forward as to the new shape for further robotic assembly.

For example, consider the case of metal body panels or aircraft panels. They start out as steel blanks 702 which can be imprinted with a dot target pattern on one inch centers throughout the total width. The targets 700 can be rather precisely applied, or if not, can be initially monitored by a camera means 708 to discern what the pattern is. Such applications could be through a roll coat 704, an etch process, or the like.

This sheet of steel 702 is then formed into a new form such as a car door or, in a more simpler case, a deck lid. It is now desirable to sue those target points 700 as viewed by camera means 710 which have now changed their form to determine any irregularities of the forming process as well as to establish the new data base for the part. Where this data base (namely shape and so forth) is a known desired one as it is in the case of a door, one would then like to compare the desired data with that resulting from the new pattern. Furthermore, this new data base can be utilized in the actual handling of the part between stations of a press line, for example, as long as it is known what to anticipate in terms of what it is. Indeed, it is noted that rather than putting down a roll coated impression every one inch at squares on the initially formed blank, one can actually roll coat down a series of dots of other target points which make a square pattern when optimally formed.

Now, take this case one step further, where a formed part 702 such as a deck lid has dot points 700 on it. This formed part is then to have a part 712 welded to its rear by spot weld robot 716, which part 712 is the inner stiffener of the deck lid. The dots 700 are viewed by a camera means 714 and not only used in the handling process of handler 718 to move this part 712 into place also using camera means 714, but also to position the welded inner part 712 relative to part 702. These dots are furthermore used to check after welding whether or not certain distortions have occurred beyond limits in the welding process and to establish the new data base for the part.

If new data base is satisfactory, the part is moved on by a suitable camera equipped handling robot to shipping or to the body build process. In this process, this formed part is mated up with other parts and again the target points 700 can be used in this mating, for example, in putting the deck lid into a deck lid opening.

In the case of doors, it is particularly important because the door is loaded with hardware and then hung from hinges which can tend to further distort the door. Indeed, if all the formed parts were made up and targeted in such a manner, it would make the job much easier for the automation and inspection through the total build of the part. This concept goes well beyond formed parts, to all types of things. However, formed parts are the ones in which the most distortion can occur.

In the final operations, the etched on or painted inked on marks, etc., if on the outside of the car, are generally painted over or otherwise removed. Naturally when such marks occur on the inner portions of the metal, no aesthetic problem exists.

This process is particularly applicable to formed metal which can spring back and generally has a relatively unknown shape such that errors in target point locations are not severe relative to the accuracy of the metal.

Another process that is somewhat similar is casting which is a relatively loose process on the same tolerance level as the forming. Plastic molding is another with the same tolerance but unfortunately this generally does not lead to distortion except during perhaps gluing operations. In any of these cases, suitable target points can be molded in, cast in, etched on, burned on as with lasers, or any suitable means can be utilized.

One can also use an absolute encoded target pattern, one which has no ambiguity as to where each target is. This could be with clusters of targets on different centers or patterns, different shaped targets, or the like.

It has been noted that this process is most applicable where more operations occur to a given part that can change its shape and where the part is more likely to change shape as a result of the operation (as in springback). This means that the roll forming, hydroforming, press forming, press brake forming and other forming operations done in the automobile, aircraft, and offroad vehicle industry, particularly are natural users of such technology. By judicious choice of targets and their applications, one can utilize these targets throughout the process for material handling assembly and inspection purposes and generally effect large cost reductions in the manufacturing as well as improve greatly the flexibility with which such manufacturing can occur.

The target application techniques can be whatever is suitable. As is obvious, the closer to a flat blank that the targets can be applied in, the better from the purpose of target application as long as those targets through the forming process can maintain their legibility.

Speaking of legibility, the typical technique is to utilize a solid state TV camera to look at the target points. This has proved satisfactory, for example, to look at etched lines on die blanks in press forming.

While target points on the formed materials and other shapes are considered here mainly in the light of formed steel stampings, aluminum graphite epoxy and other formed parts, one can actually extrapolate this to all types of structures and parts such as, for example: plywood on buildings, concrete which sets and takes a shape and then might later be used for further operations, ground (earth) as in targeting points on the ground which would then be used later on to guide particular items even though the ground had shifted or was distorted by working around it, and the like. Indeed, it is the general case that if one can get targets onto the surface of structural parts or other objects in their original form before any further work and if those targets stay on those parts throughout the work, then they can be used the maximum number of times and therefore increase the cost justification of the targeting concept. For targeting on concrete, targets such as glass beads, dot targets, or cats eye retro reflectors could be actually inserted into the material where they would harden therein and still be visible from the outside. These, of course, are idealized targets. Others would simply be little dots, points, or even non-circular targets. In fact, non circular ones could be advantageous from the point of view of absolute target coding. However, in general, circular targets are desirable.

One must consider the integration of all these target concepts. For example, discussed above is targeting the points in their bare form and looking at a changing data base for the part as it goes through the various forming and joining operations. Also discussed was designing the part in the computer with the targets present thereon, the targets being in this case either special targets or normally appearing portions of the part or both on any one part or on any grouping of parts.

In other copending applications such as those referenced above in the Background section, other systems for targeting the work area of robots and automation of guiding vehicles and other target functions are performed. The operation too of the various vehicles and robots can be simulated in the computer relative to these target points as well. Again, a key item is that with target points one is much more assured of accurate reliable operation and therefore the justification for such simulation and expense thereof is paid back by the surety of the function of the final simulated structure. And too, one is dealing with mathematical representations of target points and photogrammetric equations, not relatively unknown functions of vision systems with gray level images of object features. Simulation of dynamic target tracking also become feasible as the problem is much more defined than with gray level scene analysis. This also leads to faster assembly and more justification.

One can indeed state that the whole work area and work environment of automation in the factory of the future could well be targeted. All the parts, the fixtures, the jigs, the tooling, the robot worked areas, the passageways and areas of travel of automated guided vehicles carrying the parts, the transfer conveyers, even belts on which the parts ride could be targeted. With such target data stored in the data base of a master control computer for any one cell or an overall host computer, one has complete control of the environment. Everything is known relative to known target points such as: the location of the automation, part, the part shape, material handling, bringing the part and taking it away, relationship of other parts to the part, and the like. The data relative to this information can be manipulated in the computer and optimum operations derived such as trajectories of robots, forming, and the like. It is considered within the purview of this invention to integrate these functions to the maximum extent possible to where flexibility is attained while still having complete control over the operation.

Figure 6:
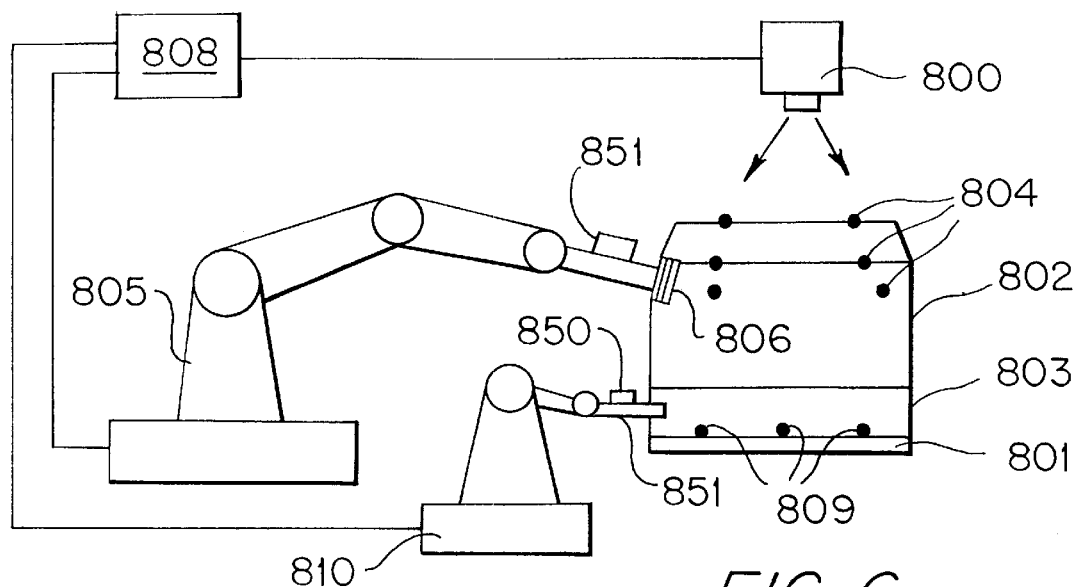
FIG. 6 schematically illustrates flexible "fixtureless" robotic assembly.

FIG. 6 illustrates robotic fixtureless assembly using targets and further illustrates the concept of dynamic target location to adjust holding or welding robots dynamically under target control in response to forces (clamping, welding) tending to change the part from its correct shape.

As shown, car cowl 802 is to be welded to flange 803 of underbody 801, under control of at least one target sensing camera 800. Camera 800 senses various targets 804 on cowl 802 and targets 809 on underbody 801 itself. The sensed data is then fed to computer 808 which is connected to holding robot 805 and welding robot 810.

Robot 805 has gripper 806 holding cowl 802 in place and having target plate 807 observable by camera 800. Robot 810 has spot weld gun 851 putting flange to cowl welds on, with target plate 850 also observable by camera 800.

The holding robot 805 is moved into position to the correct location determined by cowl 802 and underbody target location and the weld commenced. If distortions occur moving any part to a wrong position, the holding robot 805 and welding robot 810 acting in concert under control of computer 808 move to correct them. Typically, a plurality of welding and holding robots would be utilized. Some non-adjustable or non-programmable clamping or welding could also be used in conjunction.

The target's data base provides reliable accurate control over this operation and allows instant feedback correction. The procedure is flexible and could be programmed for any operation or car line. Typically, several cameras looking from different views would be required on a complex structure.

Note that when such a fabrication cell or an assembly cell is fixed all in one spot (no moving conveyors), the camera computer 808 can memorize the position of each of the pieces in build up, from its targets, even though they are later covered or partially covered up. For example, when cowl 802 is positioned to underbody 801, computer 808 records the position of underbody 801. Then, after cowl 802 has been welded to underbody 801, computer 808 again records its position. As a next step, computer 808 could guide A-pillars in each side from their targets relative to the recorded cowl position (and if desired, considering underbody 801, too).

For example, one might purposely slightly change the A-pillar locations relative to the cowl if another body portion mating to the A-pillar was related more to underbody position. This avoids stackup of errors. This really is a major advance in that it accounts for weld distortion-you can measure and correct while welding and after weld you know the final location.

Correction of distortion or stack up of tolerances in real time is absolutely a major advance. This would apply to adhesive bonding, riveting and other joining processes as well. The term "TV Camera" in the invention generally connotes a dimensionally stable type, such as a solid state TV camera, e.g. a GE TN2500. However, other means for electronic imaging can be used such as Vidicons, image disectors, linear arrays and the like. Indeed, a mechanically scanned laser beam, like a flying spot scanner, can be used to sweep through space in order to find target points some of which envisioned could be particularly reflective or responsive to laser light. The primary goal is to find target points or features. However, the TV cameras also allow normal gray level part images to be obtained, a big secondary advantage since this is often combined with the target based guidance function for inspection, recognition or other purposes.

A suitable target sensing vision system is that described in the prior copending applications noted above, and it is noted that the design program on the computer aided design system should be able to design the type of location of these targets which are suitable for the vision system.

The laying in of the targets could be by specifying operations which put the targets on as special items, i.e. by spraying them on, sticking them on, or drilling special holes or the like. The other idea is to use the CAD system to design the part, and then to look at the part as designed in its functional way. Drawing upon the knowledge of what can constitute a natural target (as in a naturally occurring hole or corner), suitable targets are specified. A computer program can be used, if desired, to augment the decision as to which natural targets are the targets to be used.

The beauty of the computer design system then would be to allow you to "try out" the design with a hypothetical target set using a typical simulation program for a RPS (or other target determining camera system) equipped robot.

Suppose one would wish to design an operation where a sheet metal door inner which is full of holes is to be attached to an outer panel by welding. One robot holds the outer, one holds the inner. The robot grabbing for the inner would use a camera system located on its end effector (or near its end effector) and guide the robot in using certain holes on the inner panel as the targets. The CAD system program would be designed in such a way as to allow a three dimensional simulation of the robot's movement to be made, and to determine the robot cycle time which would be achievable in the accuracies of position using those targets. This would be done by working through the known accuracies of the camera system, and the photogrammetric equations could also be utilized (which would be called upon from memory) and the whole system designed on the CAD system. The other robot picking up the door outer would work in a similar way, and other points on the door outer that could be picked up would be monitored and the total assembly predicted using the control equations of the two robots.

Each operation involving a particular part that might go through a line could then be tracked. For example, now that the inner and outer track are assembled, the assembly could also be sensed from the holes on the inner or other features in the operation of putting the door onto the car. This too could be automatically tried out on the computer.

The key here is that the target type solution allows us to quantify everything. Every single possibility can be predicted by mathematical equations which can be put into a simulation program used to try out designs.

One key advantage obviously is that if the whole operation is not fast enough or accurate enough, other types of targets might be specified than certain naturally occurring ones. One would then know that in planning the line layout for this operation, and one might have to use two robots per operation instead of one, etc. All of this could be known in advance.

Also, the CAD system could design the way in which the different stations interact on a line. For example, certain targets might be covered up by assembly operations and alternate targets would have to be used. Indeed, complete alternate strategies in case certain targets were missing could also be programmed into the CAD system and the whole design checked out so that such targets were present in the initial CAD design part. The assembly operations usually require the build up of components on targeted tooling which is used to hold the portions in place while other components are added. If such tooling is targeted, the location and precision of the robots, etc. doing the assembly can be vastly reduced.

We should consider the problem of assembly with and without tooling plates. In one case, where the robot holds the part to be assembled, the other robot assembles another part to it having a target. Perhaps even the first robot's gripper is targeted, which in essence then is a programmable tooling plate. In fact, changeable grippers can be used, as can changeable tooling plates, all with targets to facilitate their changing.

Continuing the ideas of these RPS things, it is not just usable on tooling fixtures for assembly. It is also welding or any other kind of fixtures operation where one would put the object onto the tooling and then add another object to it. Any sort of holding fixture will do. Again, another robot (if it is still enough to act as the fixture on the other side) can be used assuming the part is targeted.

Also covered in this case is the concept of covering up targets on an object when the object is assembled to it. For example, a radio knob attached to a targeted radio front plate with targets around the knob post would be suitable. Also suitable is the assembly of a tail light bezel to a car with targets around the attachment points.

For example, if everything could be put together from the targets in a static location, this would be most advantageous. Also desirable is to only move the part or whatever simply to 2 or 3 such static locations. For example, right now instrument panels are put together on a continuous line where they go around a continuous loop with maybe 16, 20, or 25 people standing in the loop assembling all clusters etc. into the instrument panel.

Figure 7:
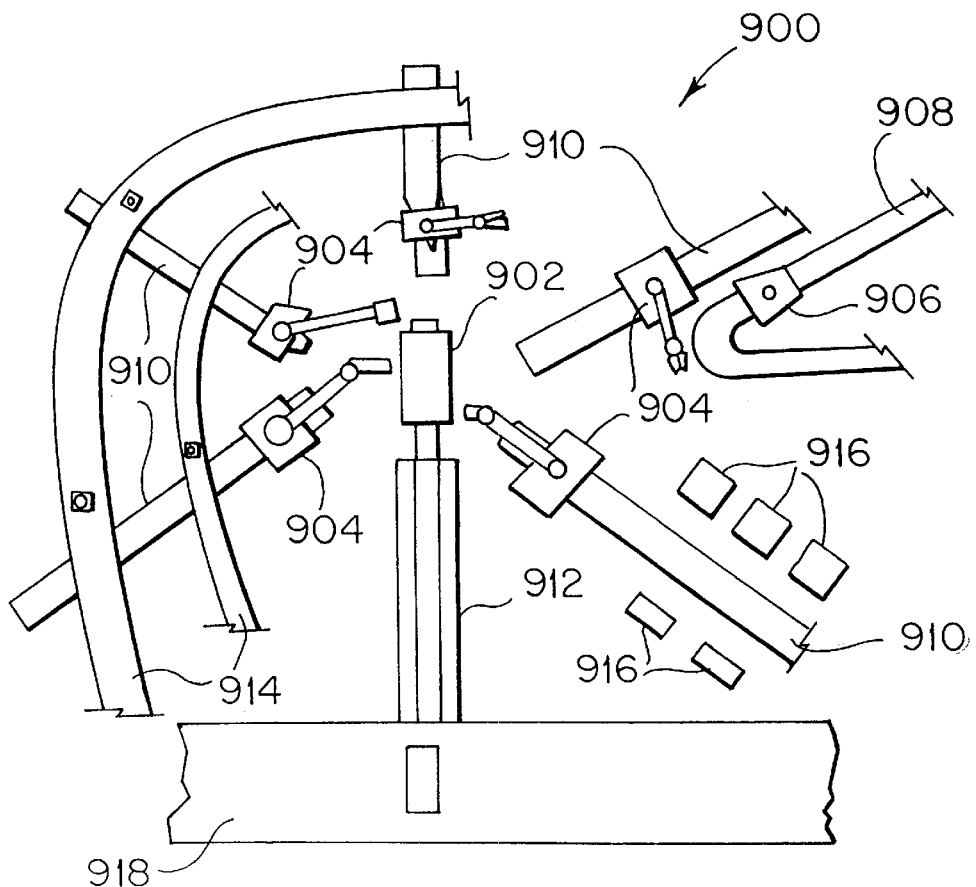
FIG. 7 schematically illustrates an assembly cell according to the invention.

Assuming that the problem of the wiring could be solved in an instrument panel line, one might replace this with a single fixed panel. FIG. 7 shows a fixed assembly cell 900 for an instrument panel, engine or other component 902 into which would be placed all of the various items by one, two, robots or more robots 904 movable on tracks 910 going out and grabbing them from different containers 916 located nearby. There are certain advantages to cell 900, namely that one does not have to deal with a moving line and that everything is fixed (which means the highest placement accuracy that could be expected.) In this condition, one would have to be able to pick out all the different parts. There might be 20 to 25 parts required for the panel, plus the multiplicity of different versions of the same thing, which might lead to a total of 100 different choices with the robot. This would require either very well positioned parts or a good vision system, and the targets would make it quite easy to do both fast and accurately.

Speed and accuracy would be paramount because if this system could not go fast, it cannot possibly compete with humans on a moving line.

Most of the parts of the instrument panel or engine 902 as shown in FIG. 7 could have targets on them, which could be made to seem like the existing parts of the panel or engine 902 (which have lettering on them or certain points or corners and holes). These are all already present in abundance on a panel or engine 902, for example. In addition, knobs on the panel can be used to cover up targets and other whole assemblies can cover up the targets on the inside of the panel which would be used to guide it in.

The central problem with this then may not be the targets at all but the tooling. If a universal robot is utilized, the robot might have to have different end effector tooling and thereby lose cycle time changing it. Such a robotic work cell is thus very appealing. However, parts would have to be brought in when they ran out from outside the periphery of the cell. In other words, what is essentially parts trains 906 would come in on tracks 908 or 914, just like tracks into a roundhouse.

With a car body, dearly the body in the first place is made up of a large number of panels welded together. This is done in-line, and at each station a varying piece is brought in, fixtures and the car body welded up. This could conceivably be done without the fixtures using targets.

For example, suppose we wish to build a car body up from scratch. We could take stampings that comprise the side of the car, e.g., start first with the cowl and the A-pillar and assume that the cowl is welded to some sub-frame. The A-pillar could be brought in using targets on the cowl and targets on the A-pillar. The A-pillar would be accurately picked up and placed by the robot on the cowl where it would then be welded once it was in place. The accuracy of the positioning would be taken from the targets on the car, not from a fixture.

Satisfactory target accuracy could be achieved with an A-pillar roughly 2 ft. long welded to a body cowl. This piece should be accurately positioned within +/−10 thousandths. Whether it is, in practice, is debatable however. First, one would figure out just what the target error is to do this. In any case, with one robot holding the part per the camera unit (which would now be not on the robot at all but off to the side so that it can get the true reference of the A-pillar to the cowl), another robot comes in and welds it. This can be done with dynamic correction, if necessary, by the first robot for position due to distortion by the welding robot. This could be called "fabrication method with dynamic real time target location".

After putting on the A-pillar, one could then go over and put on the other A-pillar, so that one could come in the body side. Indeed, all of the parts could be welded on this way, particularly those internal ones. This is really just like a completely flexible fixture. With different programs for different parts, one could make anything.

Using targeted outer parts, you can then drill all of the holes needed from the targets etc. Again, one would have to bring all the parts to it, so that it would then move the finished subassembly out of this cell and bring another one in. Instead of having a continuous line, you would have a relatively few number of stations, relatively widely separated. This would allow, however, different things to be made more easily because on a continuous line, the varying part steps would not match up (although the same technology could apply to that too).

To do an assembly like this, you might have multiple cameras too, one above the whole cell 900 and various ones off to the side coming in from every angle. This would allow you to get a better fix on each of the parts as well as deal with the fact that sometimes you would obscure yourself with the tooling doing the operation.

An interesting thing is a co-target, that is a target that tells where the other targets are. Such a co-target identifies the part and as such tells where the targets are. It also gives the orientation coordinates so that one can find the other targets.

The beauty of this one market idea is that the single market identifies the part and therefore all the targets around it. I could also give an approximate orientation code for the part, which now could include not just a reticle (which was shown in the turbine case noted above) but actual dot code or something from which an accurate orientation in 6 degrees could be created. From that, one can then find the other features of the part that one wishes to use for further use such as the corners, the holes, etc. Therefore, there is a one-step process using that single marker to tell the rest, including where the others are which in turn are then used.

Other kinds of targets include: a serial plate, either just as it is, specially designed, or with print markings; a logo; a bolt head (as mentioned above); and an instruction plate or a bar code marker.

Getting targets on sheet metal can be a problem as lots of sheet metal really does not have any holes in it per se, at least on certain surfaces that one might want to use. In such a case, we can paint targets on those for the assembly operation noted. Marks such as small indentations, ridges, tabs or the like can also be stamped in.

Painting could be done in a stamping fixture coming right out of the press, since the part is trapped anyway usually upside down. It would not take too much to lay it in another fixture and determine target locations. Another possibility would be to actually stamp the target in. This would seem to be impossible on an outer surface unless one stamped on as part of the stamping process something that would essentially come off.

The other obvious place would be in a weld fixture where one dearly welds most panels together with some other panel. Obviously, you cannot replace the weld fixture with a robot and targets if one does this, but at least the assembly of that welded up component to any other could be target automated. Weld fixtures typically also have sensing associated with them to create an in-line check fixture situation. Even this check fixture could actually contain the marking units.

Obviously there are numerous underbody and chassis components that could be targeted without any detrimental aesthetic effect—mufflers, tail pipes, brackets, clamps, tie rods, steering parts, etc. These are obviously labor prone things to assemble and one could envision robots working underneath the car while the other work is going on above in the assembly function. This is, of course, very tiring work for people and therefore would be well set up to robots. There is no reason why the whole operation could not be up above the floor. The car is brought in overhead with some robots on a second tier and other ones underneath.

This system should be usable in a variety of circumstances, such as: components that are all assembled to the body in the trim area including tail lights, glass, front, rear, wheels, headlights, grill, door handles, rear view mirrors, antennas; internal assembly components such as door assembly, lift mechanisms, trim, and instrument assembly covered above; and underhood assembly (this too probably can be marked up in any way desired with no detriment).

Note that another type of marking, purely decorative, is trim decals which could be judiciously chosen as targets.

So far all target sensing development is based on a raster scan camera. These, therefore, were generating windows, tracking, etc. Other types of special cameras might be interesting for this application. For example, if one always has 4 targets you could have literally 4 image chips with 4 separate scans of the field which would then simplify the processing. In addition, one really does not need all the number of lines that there are in a field if one uses targets that occupy large portions of the field. Therefore, a camera having 10 vertical lines and 10 horizontal lines widely spaced might be quite suitable. Instead of scanning say 300 lines with a camera, you would then scan only 20, but this would presumably be sufficient. This would require a target design that was able to be cut at multiple points and give the right answer. Naturally, the speed of response of this would be quite a bit higher.

A polar scan swept like a radar screen is also possible. Although these are not widely available, one could assume some future value.

One of the beauties of putting targets on the A-pillar, etc. is that the fixture can actually slip, and dynamic correction be made via the high speed of response to the target position.

One would also expect that you would have to have 3 or 4 targets to go along with all of this or else you could not do it. The other thing is that you would certainly want to have redundant targets in case some of them were knocked off or the paint gun did not work, or whatever.

One can also come up with a plan for automating the way in which the parts are brought in. Targeted little trucks would be provided that instead of having fixed tracks can actually reposition themselves at different locations, either in the horizontal plane or even vertically, to be grabbed by the robot. This ability to have them at multiple different planes with a very high reaching robot and targets also allows floor space to be conserved. Indeed, another robot could be used to load the parts into the racks from the targets out of the dunnage. In that case, therefore, the parts would be presented to the assembly robot in a better orientation while still targeted, possibly saving some assembly time. The other unload robot then would be used to essentially deal with the messy conditions.

From the above, it appears that all things can be made from targets. If robots can accurately position and are structurally stiff enough to withstand the forces of welding, drilling, or whatever (and this is not quite sure), then presumably all things can be made this way. However, some things apparently cannot. For example, if one has to back up a drill, this can be done with a robot in some cases, but not in other cases.

In a structure such as this, important considerations would be: where the cameras would be located, what kind of robots would be utilized, would it be better to have more than one robot holding each part or dusters of parts, etc. Particularly, the concentration should be on the target orientations and the cameras or the like.

As noted above, the following are parts of the car in which, the theory, targets would mean very little in terms of their add-on aesthetic value: under hood, under carriage, when covered up by something else as in seats over bottom part, inside door covered by trim, inside of tail light covered by light, grill covering other part, etc., inside trunk only to a degree. Those are the main areas, but they may constitute at least half of all the assembly work, if not considerably more (in fact, much more).

The other thing to be considered is can the body structure be built up with targets and then the targets taken off. This seems logical. Every weld fixture of every panel can be a place for target application.

Incidentally, there are people talking about painting the whole car after it is assembled, not just sticking painted doors on. That would of course make the job even easier. Then everything is targeted going in and you just paint over them.

If parts are targeted, then obviously, an RPS equipped robot can pick up a part in a very well known way. Assuming that the gripper is correct for this, it can then (within the accuracy of the robot itself, which also could be RPS controlled) present this part to another robot in a well positioned manner. Ostensibly, the accuracy of this position be just as accurate as if it would be fixtures, assuming that the fixturing details and the RPS were equal in accuracy. The only problem would be the inherent inaccuracy of the robot.

However, it should be noted there is nothing to keep the second robot used to assemble something onto it from using targets as well, therefore taking out that positional error. Conversely, the targets utilized by the second robot could be on the first robot as on its gripper. In other words, if the first robot grabs the part in a known way, the second robot only needs to home in on the first one, not on the part. This could make it a lot simpler for an assembly operation. A very clear-cut target board could be utilized on the gripper or somewhere on the end of arm toolings that would be directly relatable in a known way.

This two robot assembly is very similar to the human using his two hands, one to hold the first part and one to hold the second, and indeed a twin armed robot could be considered for the job as well. It is more arms and hands than it is robots per se, although they have to be separately controllable.

It is however interesting to note that the inherent accuracy of the position is considerably higher than for a human. The human, if there are no marks on part at all, would have a great deal of difficulty for example, drilling three precise holes exactly positioned in a location. The human himself would need some kind of fixture as in a template or something. Wherein in this case, the targets actually provide that since they are carried on the part. They can be on there in a way that a human would not be able to directly relate to in an easy manner. The advantages over humans are noted.

There is a special assembly technique that lends itself to this. One clear-cut aspect is targeting parts in unobtrusive zones, as on the back side away from the observer. For example, a radio knob on which the back of the knob had the targets or a door handle of a car in which the inner door panel was targeted (this is almost a natural case anyhow since it is full of holes which can be used as targets). If we then use one robot to grab at the inner side where the targets are present, we can then assemble the outer side which might be a visible one onto something.

The outer is usually the part you would like to grip so that you could assemble it to something else like the shaft on a knob or the body on a car. This is not easy to do if the targets are on the inner. What is more straightforward, therefore, is to use the targets on an item that it is to be assembled onto as in around the shaft or around where the door goes (the opening).

One possible way to do this is to have 'U' shaped tooling where it is grabbed on the rear part but held on the front via the 'U'.

One thing is sure, you could take doors that way and use drilled trim things on the outside doing it that way. This is if it all lined up. We might have to do this on the finished car, however, targeting the outside.

One could also grab the part from its targets and then move it over to a drill fixture rather than a second robot. The fixed drill fixture or whatever it is could be different for different cars say-this would of course give it flexibility. The robot would take the part and move it to one of five stations depending on which type it was sensed to be, and then orient itself relative to that station which itself would be targeted.

In the latter example, it is a gang drilling, gang welding or some other multi-position gang operation with multiple points. This would be true of a robot grabbing parts up willy nilly and just putting them in the right thing. Note however, we are talking about non-fixtures parts in this case. Parts that are not being dropped into a fixture, only presented to a gang drill that itself does not have any fixture locators because the targets have located it.

However, this might not work since in some operations the robot could not hold steady enough and you would have to drop it onto locators. But in other cases, it would just present it to it. The interesting thing about a robot, like a human, is that it could just go to one drill and sequentially drill four holes in a row using the targets to set up the straight line or whatever the other pattern was. This could be totally variant depending on what part it was, without the necessity of building the special gang drilling fixtures. This could be the putting of moldings on, but really it could be anything (even cylinder heads or something else) if one could position accurately enough and hold it, of course.

One obvious thing that you do not have to position ultra accurately is spot weld guns. This would be relatively simple. You could sequentially, using targets, put a part set to a spot welding gun that would then put different spot welds depending on what it was (or glue or anything else like that). Therefore, one robot which would target on the gun that it could aim the part off of, could actually do numerous parts in many ways, all programmably. However, such a robot would obviously not be very fast as it is a one at a time deal. This would be the opposite effect of having gangs of spot weld guns on fixed automation coming in on a part that is transferred through. In this case, a single robot would go make all the welds on a part, and it would be transferred out. It would take many more robots, but that might not be more expensive. You get to optimize the one gun you do have, or any other things such as adhesive sealer or guns or whatever.

The same logic holds for presenting a part that has numerous threaded holes in it to an automatic tapping machine or an automatic nut runner or for that matter taking a nut runner and moving it to different points on a part.

One interesting question is whether all this allows whole other assembly procedures. If you do not need special tooling and fixtures, you could just put a car together by feeding parts to the assembly point such as cell 900 depicted in FIG. 7 just as if a human was going to stand there and build a car in his garage. He would go out and get the parts and bring them in and assemble them up. The advantage of this is that you are moving the parts by conveyors to the build points, rather than the cars to separate build points. The robots 904 are going out getting the parts and coming back. Robots, for example, could be mounted on slides 910 or for that matter could be gantries themselves. This would look like a round house or something with each of the slides then being fed. However, you still have to get the parts in and out of the system or the finished cars have to be moved as by conveyors 912 and 918.

It does mean that the car as it is built up is fixed in a known place. Thus, each place you do something is dimensionally known from the operation before. This is not true in line type assembly unless elaborate shot pining is taking place. Therefore, the total build up of the car is a known commodity even if the positions of the parts and the other things feeding into it are unknown.

In this new mode, each of the parts of the car is targeted and as they are laid upon each other the assembly itself becomes targeted insofar as they are not covering up the old pieces. This means that as each robot approaches it can memorize the locations or use the targets. Indeed, the targets on some of the parts as they are positioned offer a chance to update the robot coordinate system so that it can re-memorize the positions in case the robot gets out of sync.

For welding, a robot would bring the parts in from one side, lay them down and the second robot would grab arc welding tooling and weld them all. Such a method that could be totally programmed in a CAD system. This completely relieves having to transfer data to fixture builders, etc., shaking down lines and so on since one can theoretically do this in CAD and you are dealing with minimum numbers of pieces of hardware and delivery time therefore. One robot, perhaps two robots would be working on a single area, each with different sets of tooling that they can use. Different robots might pick up parts from different sides with an overhead gantry type robot as well.

This whole procedure would just keep proceeding until the car was built. Obviously there cannot be much room for parts washers in this type of thing. Instead, the car would be transferred out on conveyors 912 and 918 after the body was welded up to a second location where it would be washed and then transferred in to another similar type station for assembly. In this case, all parts would be brought in from the outside and the assembly built up. One might do this in two stages, assembling the inner parts of the car and then using the assembly robots to go ahead and weld the top on. This type of procedure allows one to completely change ones mind as to how you are making the car. Make it one way one day and another way the next. You do not have an investment in the lines and fixtures. This is really a big advantage.

In order to achieve 60 jobs an hour, you would need 60 such robot cells each putting a car together in an hour for example. A big question is how would you feed the parts to the cells. Note that 60 jobs an hour is a typical number for both body plants and assembly plants but some Japanese run 30. We can take that to be the minimum.

Clearly some sort of very clever material handling would be required in order to get the parts to these individual drops. The simplest of all, of course, is an overhead monorail conveyor 914 bringing the parts in with the robot simply going over just as the human does in a transmission plant and grabbing off the one it wants in place for its job. This would be by far the cheapest, but would require numerous conveyor loops which might get in the way of each other since we are talking about multiple types of parts coming in at once. The loops might have to go in a circle around the whole operation with the robot moving radially outward from its job to find the part it wants, grabbing it, off and bringing it back.

A second way is to simply have them in racks 916, bring the racks in (as many of the parts are racked anyway) and bring them in with trucks to each of the individual job sites. For example, if each rack contains 16 parts, we can do a day's production with a single rack full at any one cell. The true flexibility of this is a distinct advantage.

One of the fascinating aspects of all of this is that probably the optimum way in which the car was built could be totally laid out on a CAD system. Different cars would use different sequences or different ideas. You could build anything given this approach, just as humans could in a garage if they were presented with a kit of parts.

Note too that the CAD system could also design the target on the part-specifying special stamped in (cut in, molded in, etc.) targets etc. at certain points on the part surface. The CAD system too would not only know the location of the targets to other part features, but to all other targets on all other parts used to form the assembly.

Figure 8:
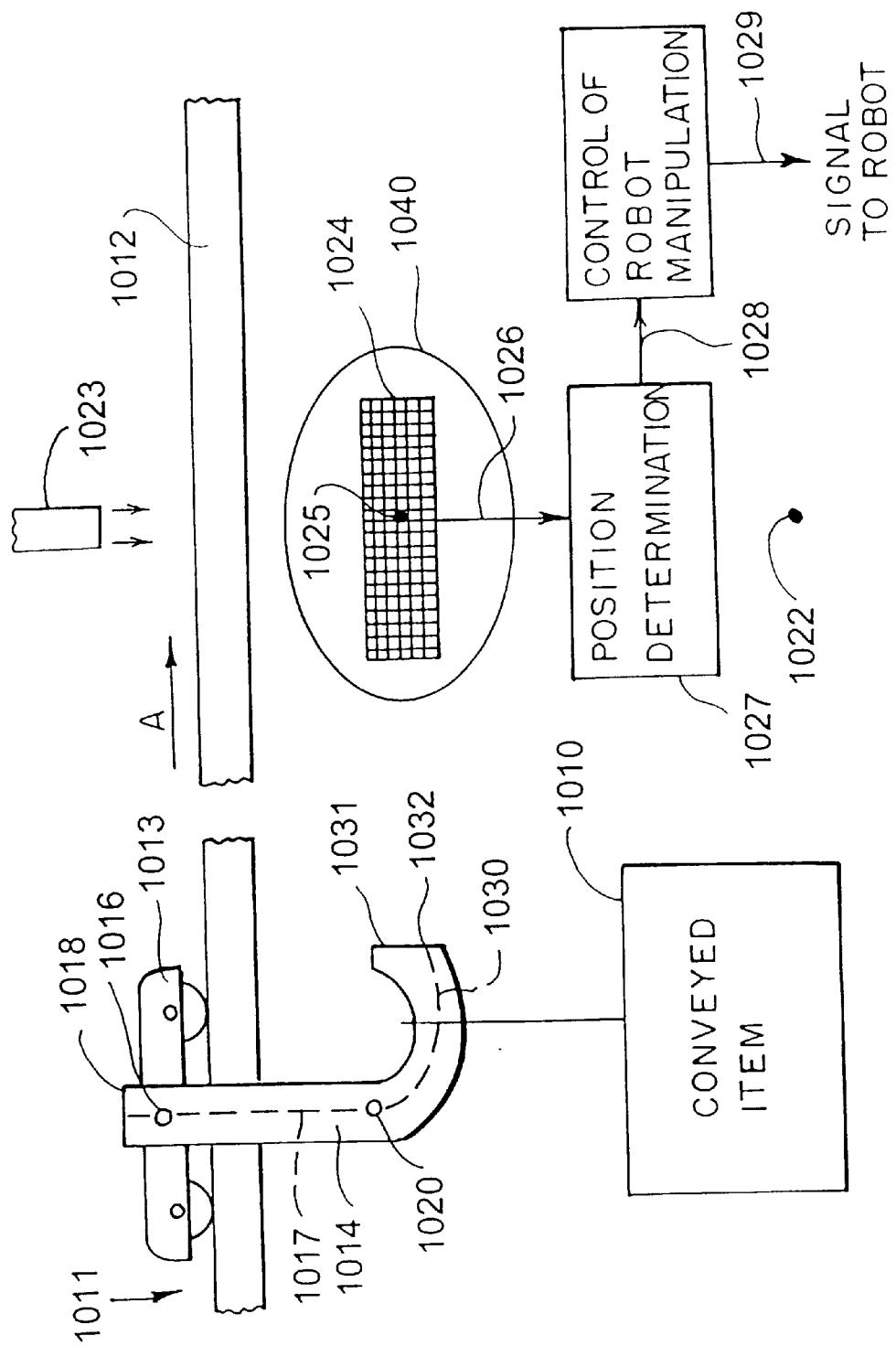
FIG. 8 is a diagrammatic side elevation view of an overhead conveyor system utilizing the present invention.

With reference to FIG. 8, an item 1010 is shown being moved in the direction of arrow A below an overhead conveyor system 1011 generally comprising a track 1012 on which a carriage 1013 is movable. Object 1010 is suspended in any suitable manner from a hook 1014 secured to carriage 1013. Hook 1014 includes an aperture 1015 for a bolt 1016 for securing hook 1014 to carriage 1013. A fiber optic 1017 is embedded within hook 1017 and has a light receiving end 1018 in a surface 1019 of hook 1014 and a light emitting end 1020 in a surface 1021 of hook 1014. Fiber optic 1017 can be any fiber optic element such as a single fiber optic or a bundle thereof, of which several are commercially available. A plastic 'corfon' fiber optic element is quite suitable.

In FIG. 8, it is assumed that it is desired to determine the position of item 1010 suspended from hook 1011 when item 1010 is at a general location designated 1022, in FIG. 8. It is also assumed in FIG. 8 that item 1010 is in a known position relative to the position of hook 1014.

A light source 1023 is positioned above track 1012 to direct light downwardly such that it will be incident on the upper surface 1019 of hook 1014 of carriage 1013 when a carriage is positioned below the light source.

A light detector 1024, in this case a scanning matrix photo detector camera comprising a lens and a detector array comprised by a plurality of horizontal rows of discrete photo diodes, is positioned adjacent the conveyor so as to be adjacent hook 1014 when conveyed item 1010 is located generally in position 1022. More particularly, when the conveyed item is in position 1022, the light emitting end 1020 of fiber optic 1017 is imaged by the camera lens 1040 onto the matrix array which provides real time information as to the location of hook 1024.

In a typical case, illustrated in FIG. 8, the light 1025 emitted from end 1020 is imaged to form a spot 1025 on four adjacent photo diodes of array 1024. As the photo diode array is scanned, an output signal 1026, indicative of the position of the spot of light 1025 on array 1024 is conveyed to suitable means 1027, such as microcomputer, to determine the position of hook 1014, and thus item 1010, relative to any known position, such as the position of a robot, or the position of detector array 1024. A signal 1028, indicative of the position of hook 1014 and/or item 1010 is then conveyed to suitable robot control means for control of a robot, not shown, for manipulation of the hook 1014 of conveyed item 1010. A signal 1029 controlling the robot thus includes positional information concerning the hook 1010 or item 1014 to be manipulated by the robot.

It will be readily apparent that the matrix array in FIG. 8 provides positional information in the x and y directions in the plane of the drawing. It is also possible to readily provide information concerning position in the z axis. For example, as shown in dotted lines in FIGS. 8 and 9, a further fiber optic element 1030 may be embedded in hook 1014, extending from horizontal upper surface 1019 to front surface 1031 which extends vertically and transverse to the plane of the drawing.

Thus, a further linear photodetector array, positioned to detect light emitted from light emitting end 1032 of fiber optic 1030 would provide a signal indicative of the position of hook 1014, and thus item 1010 if desired, in the "z" axis, that is, in a direction transverse to the plane of the drawing. This signal would be processed in the same manner as signal 1026 to provide a three-dimensional determination of the relative position of the conveyor hook and/or suspended item such as its position relative to a robot. Alternative means utilizing additional targets for providing three dimensional data as to hook location using multiple targets are disclosed below.

Figure 9:
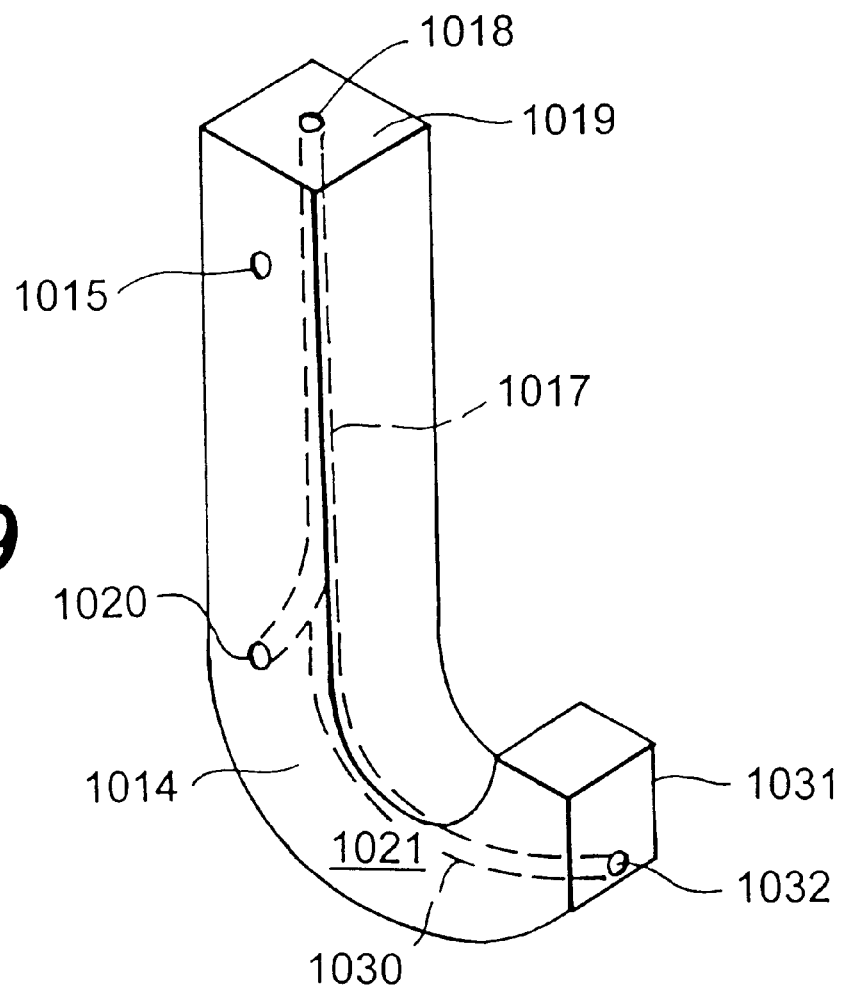
FIG. 9 is an enlarged diagrammatic perspective view of hook 14 of FIG. 1.

In the embodiment depicted in FIGS. 8 and 9, the elongate light conducting means is shown embedded in hook 1014. In some instances, as where hook 1014 is a monolithic cast metal item, it may be more convenient to fix the fiber optic to the hook in some other way as by simply gluing or otherwise adhering to an outer surface thereof. In that event, however, it is preferred to provide a housing for the fiber optic to prevent damage in use. This is readily achieved by providing a groove or slot in a surface of the hook, in which the elongate light conducting member can be laid and thereafter covered with a protective material, preferably opaque.

Where the invention is utilized to determine the position of a member of like objects, such as the position of a plurality of identical hooks 1014, it is preferred that the position of the light emitting end or ends of the elongate light conducting member are in substantially identical position on each item. Where this is not practical, or where more precise position determination are required, the position of the light emitting areas of each object may be calibrated.

In the embodiment of FIG. 8, the light conducting members are fixed to hook 1014. It will be readily apparent, however, that the members be flexed to suspended item 1010. In the latter event, position of suspended item 1010 is determined directly whereas, in the latter case, it is determined indirectly by determining the position of hook 1010 and by knowing the position of a suspended item relative to hook 1010.

Figure 10A:
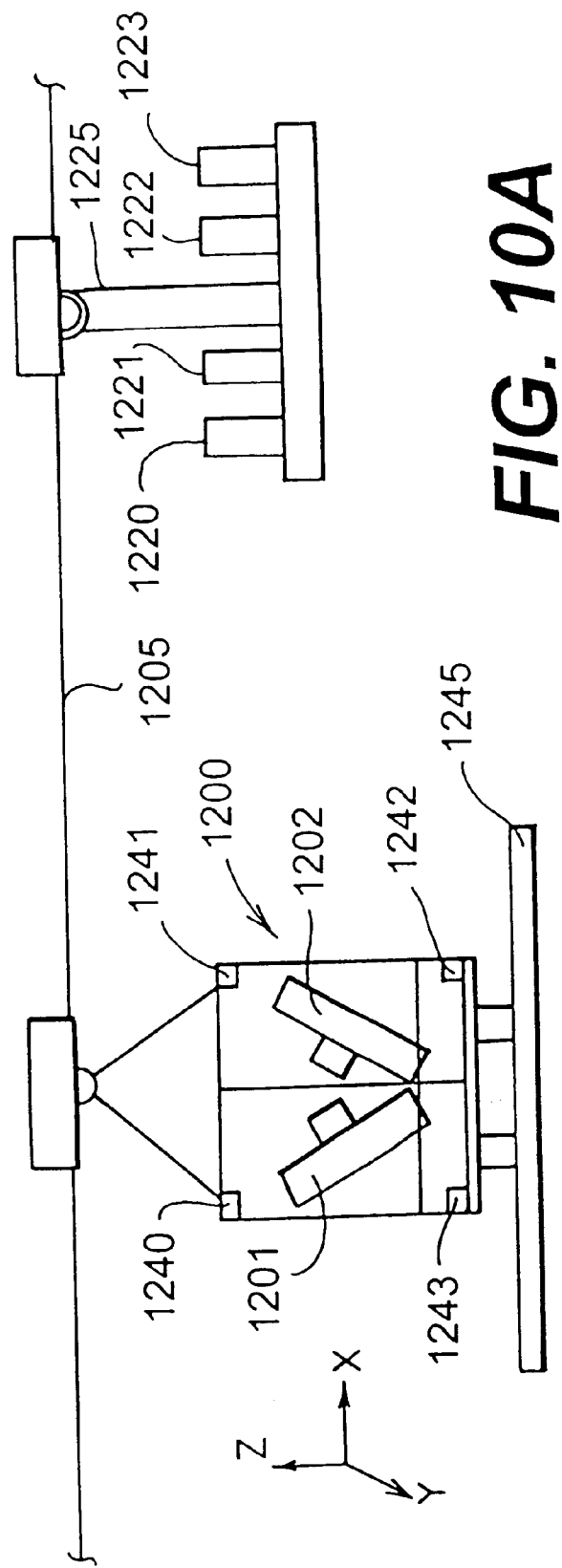
FIGS. 10A, 10B illustrates a complete system for the picking of transmission clutch parts off of overhead monorail conveyors in an automatic transmission plant. The sensor is of the general type described by Pinkney, utilized to track the conveyor carrier(s) which are targeted by means herein disclosed. Optionally, an additional sensor or analysis means on the robot may be used to find the part within the carrier.
Figure 10B:
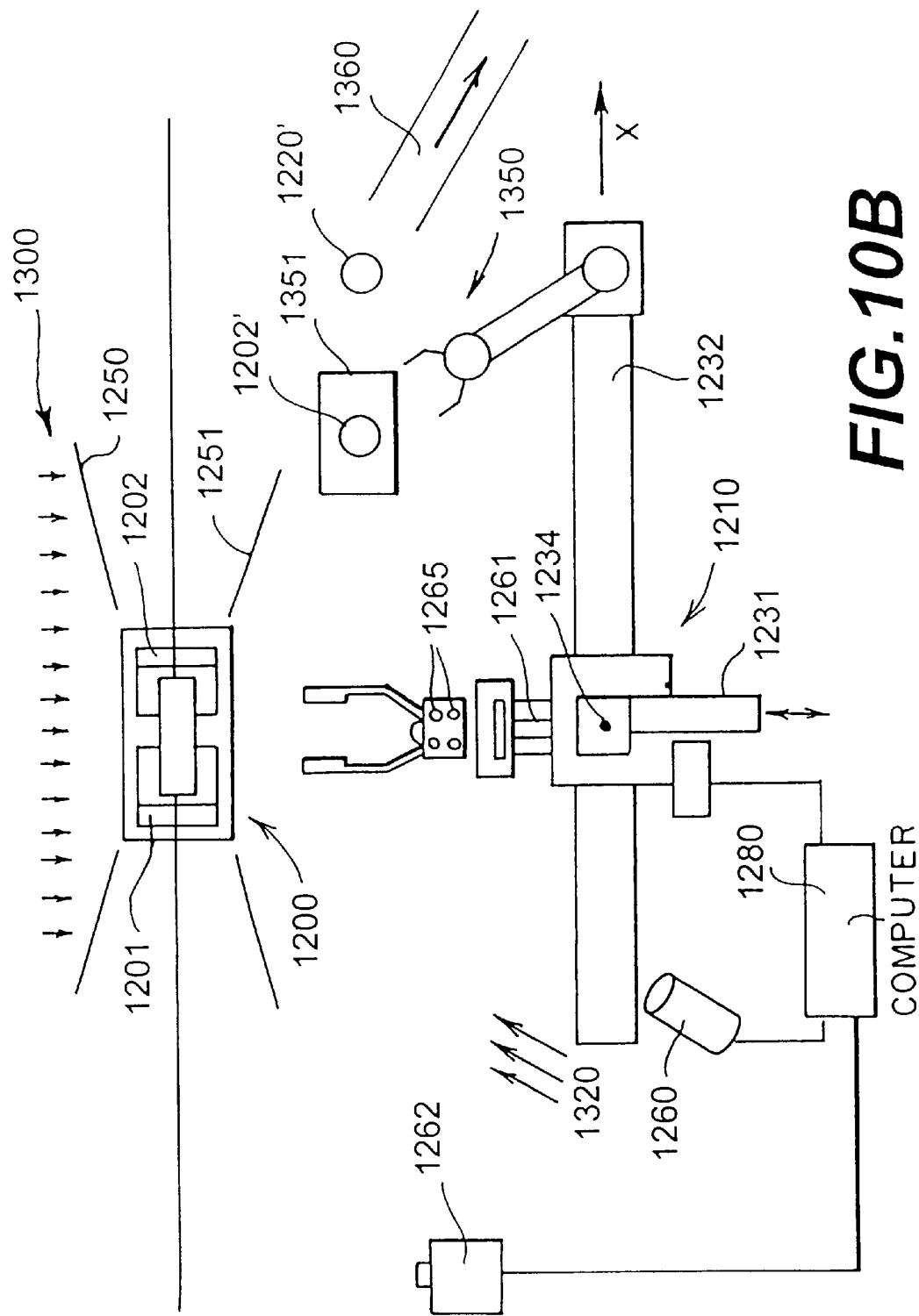

FIGS. 10A and 10B illustrate a basic application of the invention to an important sector of robot usage, that of taking parts off or placing parts into continuously conveyed containers or transport media. There is substantial amounts of labor worldwide utilized in this material handling procedure. In addition, many assembly operations require a human to first take a part, for example, off a conveyor, (for example, an overhead monorail conveyor here illustrated) and assemble it to some other part. He may have to then put the part back on such a conveyor. In other words, only if the conveyor interaction problem can be solved, can the assembly process be automated.

A particular embodiment of the invention is shown here utilized to remove transmission clutch parts off an overhead monorail carrier. In this particular carrier, 1200, there are two parts, 1201 and 1202, resting in a pocket of the carrier. To keep the cost low, the carriers are typically made out of angle iron, bent rod etc. and are not overly precise in any direction. In addition, they are conveyed often from an overhead rail 205 and can swing in the direction of motion, side to side and twist over limited angles. They can vary easily in their position from the reference point of the monorail +/–½ inch and as time goes on, they degrade still further due to repairs, substitutions etc.

Rather than attempt to build highly precise conveyors, it is of extreme interest to provide a robot system that can deal with this particular type of conveyor, not only allowing one to retrofit existing plants, but further keeping future conveyor costs low—at the price of certain additional sophistication in the robot hardware. As can be seen from this particular example, however, the embodiment of the invention provides a system which can be made at low cost, much less than that of providing precision conveyors capable of being used with robots without the invention.

As shown in the top view, a robot 1210 is positioned to grab the part off of this particular monorail choosing one of the two parts in this particular carrier. At a later time, it may choose any one of parts such as shafts 1220 to 1223 located in another carrier 1225 on the same monorail, to be used in assembling with the first parts. For example, robot 1350 is used to assemble the parts pulled off the conveyor by robot 1210.

The robot 1210 can be of any particular type. However, a cartesian coordinate robot is generally preferred and a specialized one for this purpose is shown in the drawing. It is noted, however, that polar coordinate robots can be utilized, although they require much more control sophistication. A polar coordinate robot on moving linear slides parallel to the conveyor can also be utilized but requires added cost.

As shown, cartesian coordinate robot 1210 has an arm 1231 moving in and out toward the conveyor line 1205 and it moves along an x axis slide 1232 parallel to the conveyor. The third axis is the vertical axis or z axis out of the plane of the drawing 1234.

In this invention, the carrier has been provided in this example with four targets located, in this example, at the four corners of the carrier, 1240 to 1243. These targets can be any type, for example those described in this application. The use of four such targets is not necessary, but is preferable in many cases to provide a full six axis solution of object position with redundancy. Three targets is sufficient to provide the solution alone. The carrier also contains, desirably in this case, a snubber rail 1245 located beneath the carrier which can contact certain mechanical guides such as 1250 and 1251 to restrain the side to side motion. These guides are also shown in the end view (FIG. 11). They can optionally be spring loaded as shown such as 1251 to keep the snubber up against the stationary guide 1250. A lead-in on the snubber guides is shown in the top view.

FIGS. 10A, 10B, and 11 illustrated targets such as the four as shown affixed to the carrier. In this case, these targets provide a signal from which the sensing camera unit such as 1260 can lock on. This camera unit can be located either on the robot arm as 1261 or external to the robot as 1260 (shown mounted by the side but also mounted above the station). If it is external to the robot, it may also be desirable to also have targets such as flashing LEDs, 1265 on the end of the robot arm which can also be tracked to provide relative data. Both types 1260 and 1261 can be used to provide data from different points of view.

When the robot sensor such as 1260 has locked onto the carrier (or other item, see subsequent embodiment) it can then track this conveyor even in its side to side motions in a reliable manner due to the very high signal to noise ratios of the targets as will be discussed below. This is vastly superior to looking at the parts or carriers from their gray level images in this kind of swinging and uncertain environment. It is noted that the referenced Pinkney invention or other photogrammetric solutions can offer high resolution data in up to 6 coordinates, x, y, z, roll, pitch and yaw. This is fully sufficient and often more than sufficient to accomplish the job, particularly if constraints such as the snubber guide rails 1250/1251 shown are utilized to restrain the motion in one or more axes.

Once the main camera unit such as 1260 has locked onto the conveyor and can compute its position for the feeding to the robot command computer 1280, then a second system (such as 1261), either using a different camera or simply different lighting, circuits etc. can tell where the part is in the carrier.

An important feature of the invention is the use of one camera unit to track the targeted conveyor (or other object) while a second subsystem, even with the same camera, senses the part within the conveyor carrier or on it. Such a second camera or subsystem is described in reference no. 6, and can provide up to five axes of data itself (x, y, range, pitch and yaw). This system can be right in the gripper as in FIG. 8 of referenced copending application (Ser. No. 200, 401).

It is noted that the sensing of where the part is in the carrier does not necessarily have to be made at the robot station. It could be made upstream, using for example sensor camera 1262. This serves the additional purpose of signaling the robot system if any out of specification situations exist, so as to abort the attempt to grab the part. This could be a badly mangled carrier, a carrier with no parts at all, a carrier with the wrong part, etc. Thus, identification of the part obviously can be done as well as sensing its location on the carrier, pallet, or whatever.

Once the decision has been made as to where the part is and the fact that it's a correct part, the robot moves in to remove it or conversely to place another part back on the carrier. In this case, the control computer 1280 of the robot takes the data as to the coordinate position of the targeted carrier and continually updates the robot's information. With a cartesian coordinate axis, it is particularly easy to make this approach since one can simply run parallel to the conveyor (x direction) and only take out the differences in position relative to the parallel line of motion. While this can be done with a polar coordinate system, it is much more difficult to do dynamically. In any case, one need follow the carrier only in an approximate sensor using the gripper, and possibly other sensors to take up the difference.

The tracking target approach, for example, using hardware such as disclosed in Pinkney or a twin stereo approach with two cameras, can be accomplished using a camera tracking both the gripper and the carrier conveyor (or part) and/or with a camera mounted on the robot arm itself. The reason why this is so successful is that it tracks targets which can have, and maintain, high visibilities even in an industrial environment. These targets can be differentiated by means of intensity, color or shape. Any and all can be utilized by this system.

For example, in the end view of FIG. 11, light 1300 from light source 1301 behind the carrier can be provided which illuminates the targets 1240–1243 at the four corners (or any other place). These targets can be simple apertures in plates such as circles, squares, triangles, etc.—whatever is distinctive and can be discerned by a computer vision camera such as 1260 or 1261. A triangle aperture 1302 in target plate 1241 is shown for illustration.

Alternatively, the targets can be comprised of color filters such as 1305 and indeed a different color could be used for each different target (1240–1243) or different part carriers if desired to automatically code which is which, if this is a problem, as it could be in certain more random applications. In this case, when utilized with white light source 1300, the color of the target is an immediate indicator. However, in some industrial environments, maintaining a colored fitter may be harder than a simple slot.

It is noted that when utilized as shown, with the light source behind, it may be desirable to put a diffuser such as ground glass 1310 (dotted lines) in the slot or near the slot (but not necessarily on the carrier) such that the light is directed over a range of directions. Other more directional diffusers such as diffraction gratings, prismatic devices and the like can also be used where more light is desired at certain angular locations such as the approach path of the robot, or in the direction of camera 1260 for example.

It is also, of course, possible to use the fiber optic based targets such as disclosed in FIGS. 8 and 9 above and in Ser. No. 200,401.

A final type of target of use on a system such as this is a retro-reflective target, such as plastic prismatic retro-reflectors, retro-reflective tape, lectilinear material and the like. This is shown as target 1242 in FIG. 11. In this case, a light field 1320 must be provided to illuminate this. If reflectors having a high degree of retro-reflective capability are utilized, the light source should be coming from the same angle as the sensor (e.g. from 1260). The source could either be fixed or mounted on the robot. The reflected light field is shown 1321 directed back along the incident path.

Figure 17:
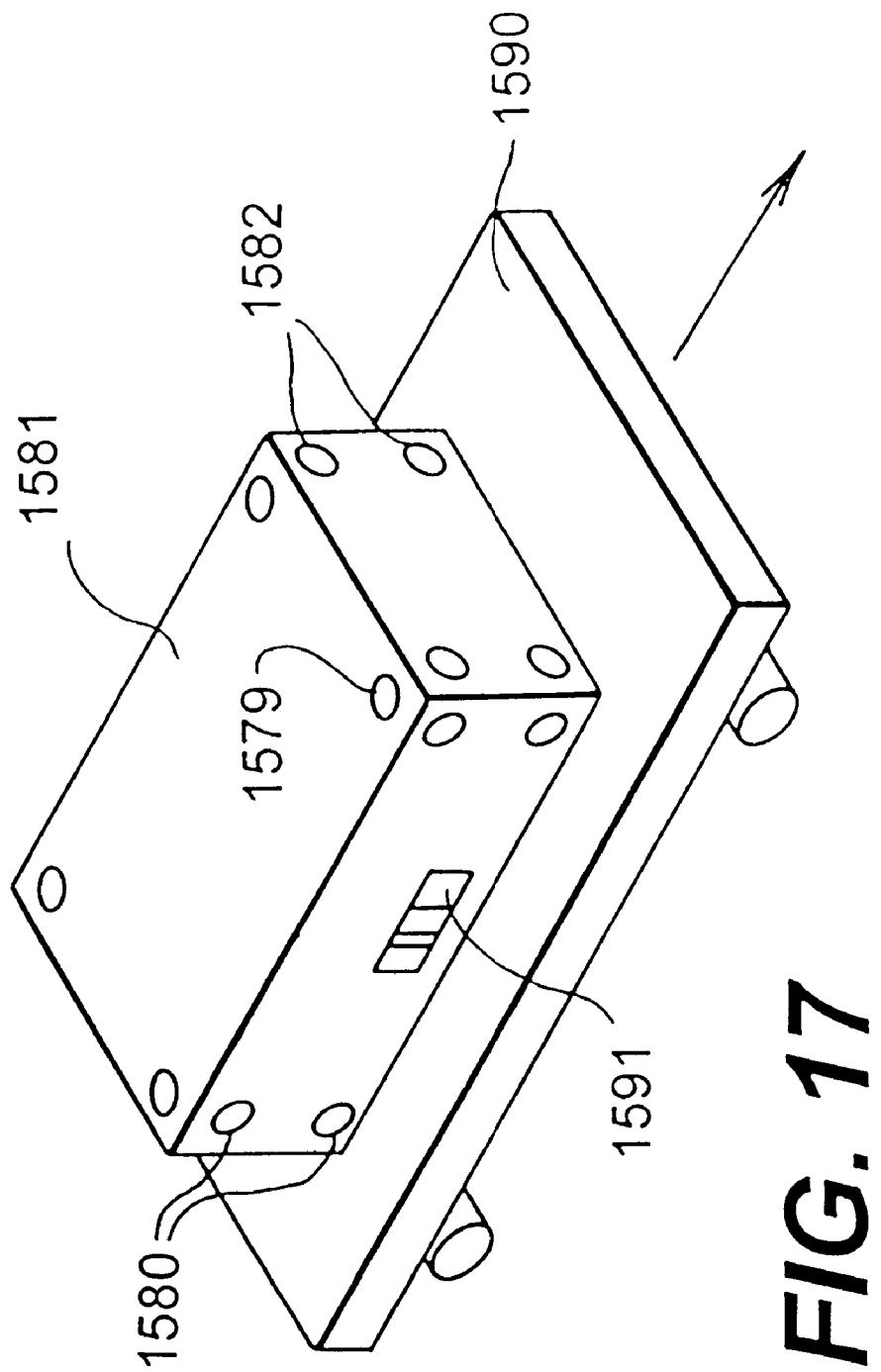
FIG. 17 illustrates a robotic system employing targeted boxes randomly spaced on a roller conveyor, utilizing either targets printed onto the box, fibers, or retro-reflectors.

Let us now consider the question of targeting the parts themselves or a container of parts such as carton 1579 travelling on a pallet in conveyor of FIG. 17 wherein the targets are simply printed on.

There are many means of implementing such targets on parts, although this is obviously somewhat more difficult since one has to consider the function of the part and often it's aesthetics as well. From the point of view of the robotic system, however, targets need to be such that at least three of the four targets for example are visible in order to provide a satisfactory 6 axis solution to the photogrammetric equations. Under certain circumstances, where there are more constraints, perhaps only one or two targets need be visible.

In continuing the example of FIGS. 10A, 10B, and 11, it is noted that it is sometimes desirable to have an auxiliary robot such as 1350 (possibly with polar coordinates as shown) to take parts such as 1202' which robot 1210 has pulled out of the carriers and loaded onto an assembly fixture 1351. This robot then assembles different parts such as the shafts 1220' for example that have also been pulled off and puts the two parts 1202' and 1220' together and then shoves the completed assembly down on a chute onto an outfeed conveyor 1360.

Alternatively, robot 1210 can be utilized also to perform the assembly operation particularly if it is provided with rotation about the y axis. A dual robot system, however, is faster since one can be assembling while the other retrieves more parts.

The converse is also true, the previous assembly can be going on while robot 1210 puts the assembly back on a monorail conveyor of the same type. For example, in this particular application, a second conveyor can be located right under the first conveyor 1205 on which the assembled parts were placed. This conveyor could be floor mounted or overhead. Robot 1210 could also turn around 1800 and put a completed assembly on a conveyor parallel to 1205.

FIG. 12A

FIG. 12A illustrates a car door targeted according to the invention 1352 travelling on a conveyor 1353. As it passes a light source 1355, four fiber ends 1359 are simultaneously illuminated and light emanates from the opposite fiber ends 1360 to 1363 which then form the targets. These fiber ends are flush with the door panel which itself may be plastic such that the plastic fiber blends with the plastic door. Indeed, the fibers carrying the light 1370 to 1373 may be cast right into the plastic in the injection mold. They may be in the door panel sheet, laid in just as if they were regular glass fibers in a SMC (fiberglass) door, or maybe carried in or adjacent the ribs of the door (if any). Alternatively, where there's an inner and outer panel, the fibers may be placed in between.

A camera unit 1368 looks at the light from the fiber ends 1360–1363. This camera may be located overhead the conveyor and/or on a robot arm coming in to pick the door up for example.

The light source itself may be pulsed to create a higher signal to noise ratio of the targets relative to ambient light It is noted that each of the fibers comprising the targets may transmit colors to allow color discrimination on that score. Indeed, one might even think of the fibers 1370 to 1373 as bundles of fibers. Indeed different numbers or arrangements of fibers and different arrangements of the target ends 1360 to 1363 could be used such that varying codes were used to delineate which was which and what door type etc.

It is noted that paint, ink or other film or coating type targets can be sprayed on parts utilizing spray marking guns. Particularly effective for this in terms of producing nicely shaped targets such as triangles and other items that have a very recognizable shape is the Diffracto TurboJet, U.S. Pat. No. 4,269,874. Clearly, a marking station on the panel for example could be utilized to spray certain targets on with paint. These targets can be provided with special paint such as phosfluorescent, infra red absorbing or ultra violet reflecting, something that would tend to distinguish them under certain types of lighting. They could even be clear coating which would be invisible to the eye but under certain lightings would fluores or absorb certain wavelengths preferentially. The latter would be particularly nice for finished parts. However, any sort of paint could be utilized for example on an unpainted door which would later be painted just as long as it was chemically compatible or would be removed in a normal preparation process.

Figure 12B:
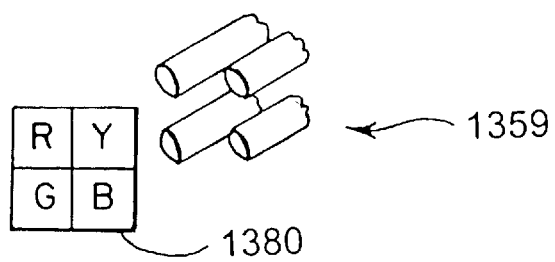

FIG. 12B illustrates the color filter plate 1380 which can be placed in front of the group 1359 of four fiber ends of FIG. 12A This color filter plate has filters red, yellow, green, blue as shown which cause the light emanating from each of the fiber ends 1360–1363 to show those colors for example. These colors could all be infra red or any other colors.

An alternative for differentiating which target is which, is to actually use different light sources for each of the fibers and modulate them at different rates or pulse light on each of the fibers sequentially.

Figure 13:
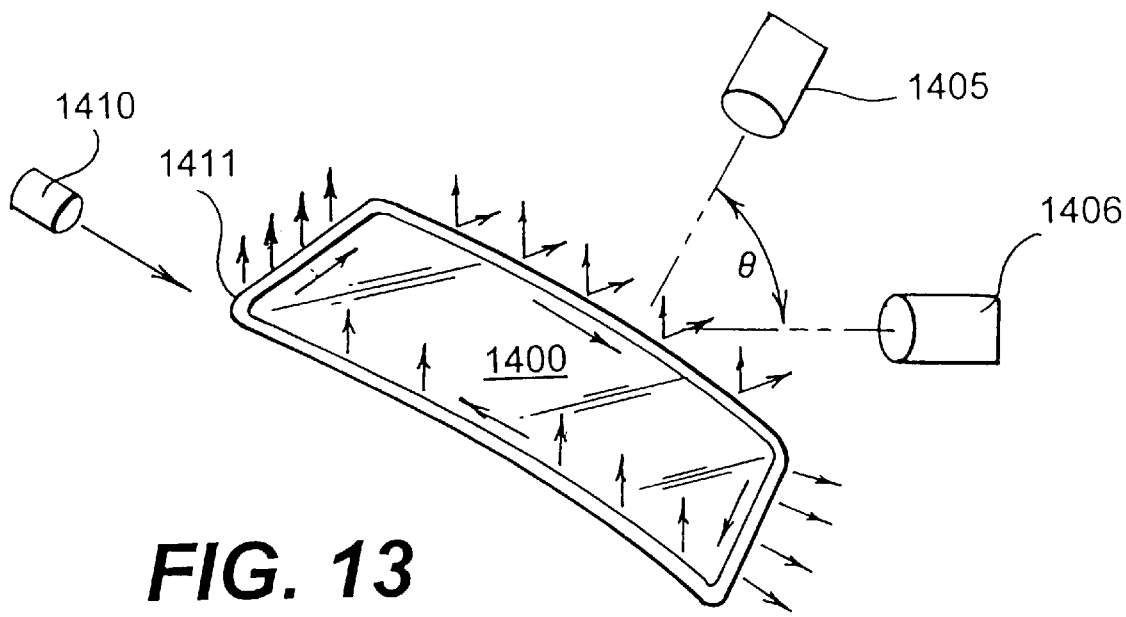
FIG. 13 illustrates a car windshield with lossy fibers to outline its periphery, which is imaged by stereoscopic cameras.

FIG. 13 illustrates another application of the invention, this one being to a windshield 1400 the edges of which as well as other features are viewed by cameras 1405 and 1406 having an included angle, between them such that 'stereo' vision in terms of depth perception is provided.

This stereo vision or any other vision of this part is made vastly easier by the delineation of the object edge provided by the 'lossy' fiber 1411 which runs around the periphery of the part emanating or 'leaking' light at each point as it goes when illuminated at its end by light source 1410.

While the whole edge has been delineated in this particular example, it is obvious that only sections of the edges of a part such as this are required for accurate placement of it. It should be noted as well that it allows for actual mensuration of the part itself since the contour of the windshield edge is desired to insure that it will fit into the windshield opening of the car in a correct manner.

The fiber in this case can be cast into the windshield glass at the time of manufacture and could even be a glass fiber itself simply of slightly different characteristics. Alternatively, this fiber could be really just a portion of the same glass made in such a way as to convey light around the windshield periphery.

It's obvious that these same principles could be utilized on plastic or for that matter, even on metal parts where the fiber would simply be glued onto the periphery of the part or be covered over only in part by the metal if desired.

It should be noted again that the light emanating from the fiber can be infra red or any other wavelength that might be desirable for better delineation of the surface. Indeed, the fiber in the case of plastic, can be buried such that it could not normally be seen under visible light but that infra red radiation, in this case emanating from the fiber outward through the glass or plastic could be seen.

Clearly, more than the four targets shown in FIG. 12A on a door can be used as can more zones than simply the periphery of the part of the windshield such as FIG. 13. However, these are the two principle examples, namely four points is the sufficient solution including a redundant check of the six axis, photogrammetric equations, and of course the periphery is the main item of interest when looking with stereo cameras.

Note that in FIG. 13, many fibers are lossy just by themselves. If additional losses were required, for example when they were imbedded in a matrix, the fibers could be roughened for example.

Clearly, plastic pallets and carriers can also be so instrumented. Indeed, light conductive paths can even be built into the plastic of a carrier such as FIG. 11.

Figure 14A:
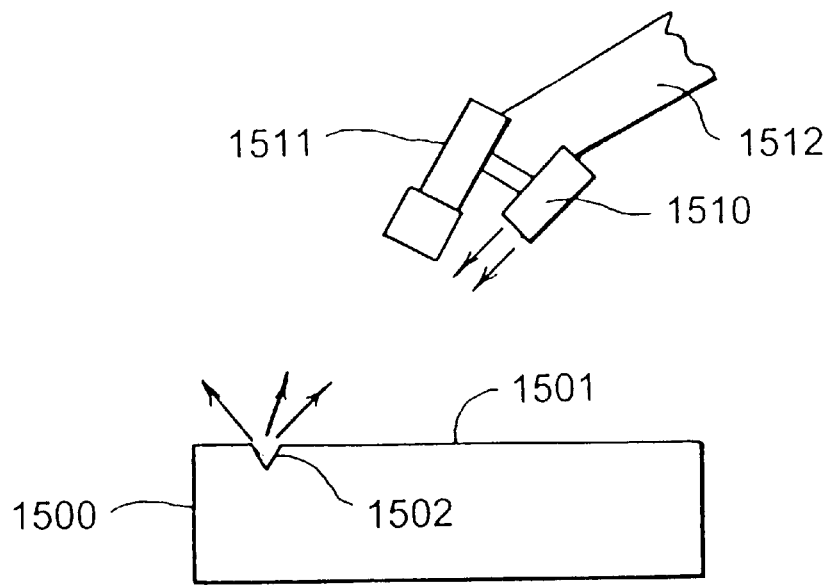
FIGS. 14A, 14B illustrates a part targeting embodiment employing drilled holes.
Figure 14B:
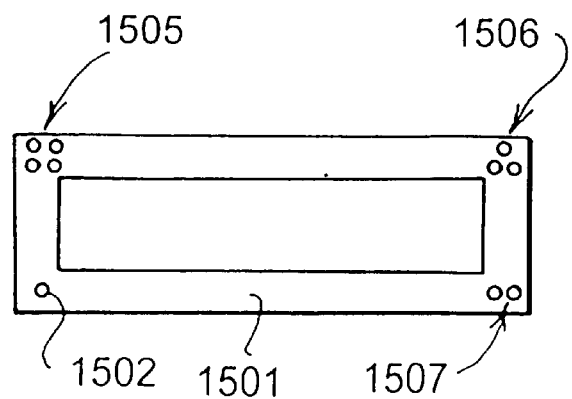

FIGS. 14A and 14B illustrates another method for targeting objects. In this embodiment of the invention, a cylinder head 1500 is targeted, in this case on the rocker cover rail 1501, with targets 1502, 1505, 1506 and 1507 on the four corners of the rail perimeter.

Target 1502 in this case is formed by a single depression in the rail, for example, the conical surface made by a drill as it just touches the metal. Such a conical surface reflects light at diverse angles from that of the flat machined face of the cover rail itself, and therefore makes an excellent contrast target when viewed at appropriate angles. For example, when light from source 1510 carried on robot 1512 hits the cover rail containing such conical target, light is directed back at camera 1511 from the target because the face of the target is pointed more or less at the camera 1511. However, the light from the cover rail is directed off at a angle away from the camera. Therefore, it appears bright against the background of the cover rail and against that of the cast surface of the part. In other cases, the rail surface would be bright and the conical surface dark. The fact it is a cone, means that approach from any direction in the plane of the rail face desirably produces similar results.

Shown in the top view for illustration, different sets of targets have been shown on each of the corners. However, it is considered likely that in any one case, one type of target would be used. For example, the target cluster 1505 contains four such conical faces or for that matter, four targets of any sort such as will be shown in FIG. 15 for example. In this case, four targets of course are much more unusual than a single point and would be unmistakable relative to any sort of backgrounds since nothing else on the part could have such a duster reflection. In this case, the center of the four dots gives the center of the target.

The same holds true of 1506 which is a three pointed version, also providing a center. Cluster 1507 having two points, while probably unmistakable, does not have a center point except in the one plane. In this case, therefore, the center of the dots themselves would have to provide the answer in one plane.

Figure 15A:
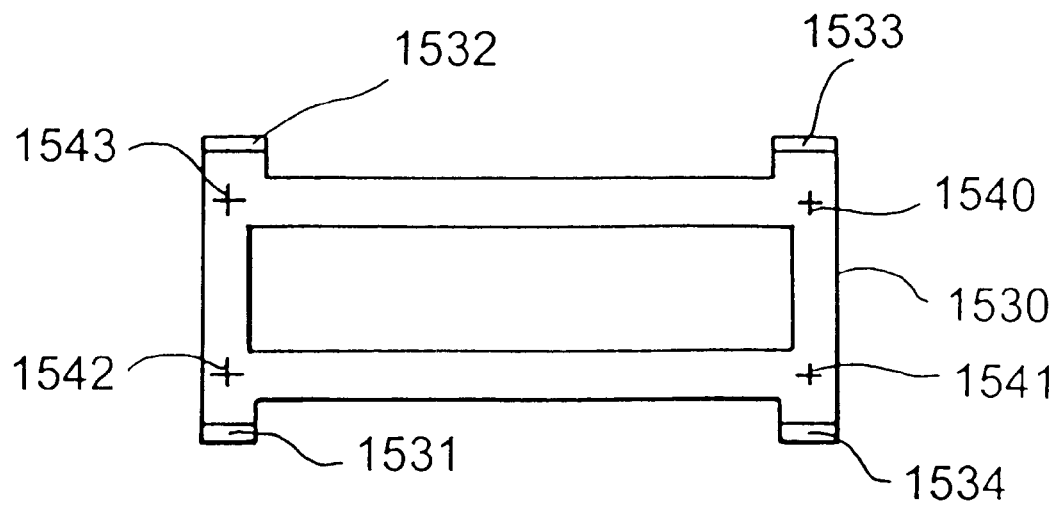
FIGS. 15A, 15B, 15C illustrates a part targeting embodiment wherein said targets are cast into the part or are appendages thereto.
Figure 15B:
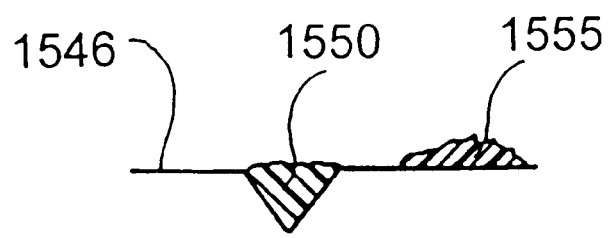
Figure 15C:
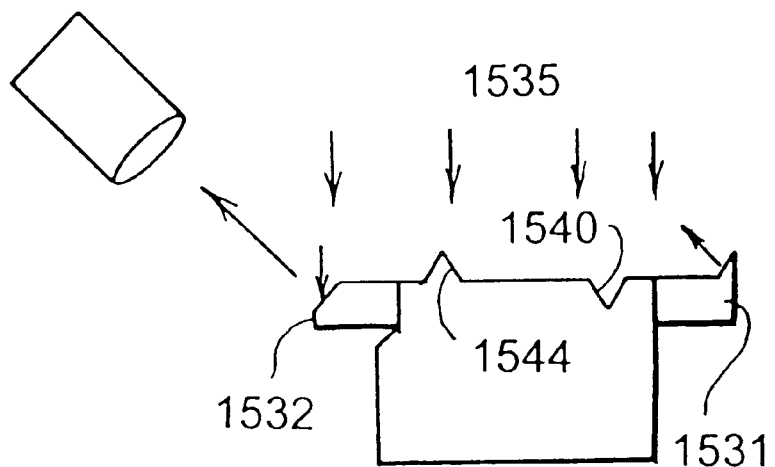

FIGS. 15A and 15C illustrates another target method, also applied in this case to cylinder heads but of course general to any sort of part. In this particular case, the part is cast where it is shown that on cylinder head casting 1530, there are appendages cast which do not interfere with either the assembly or the function of the part. These are shown as 1531, 1532, 1533 and 1534. These appendages are indeed targets and of course are unmistakable in any sort of view.

To make them more unmistakable, certain angles have been cast into their sides. Such as shown in the end view of 1532, the particular angle of reflection transverse to the head axis is such that when overhead light from an overhead light field 1535 is projected, that these facets shoot light off to a camera at a preferred angle. In this particular case, the opposite one 1531, would have to be made in a different way as shown, such that it too had a facet in that direction. It is noted that the direction can be chosen such that no other features on the part have reflective angles in the same direction. In other words, for any part, no matter what it is, one should be able to find certain angles at which target data can be made to show up either brighter or darker than the rest of the part with no other, or at least a minimum of other part features having angles at these directions. This of course helps the discrimination in a passive manner.

Similarly, certain targets can be beveled in more than one plane, such as 1533 as shown such that when viewed from either of two angles, a brighter reflection is shown. (Conversely the lighting can be at an angle and the camera located overhead.)

Also shown in this drawing, are cast in target cones or crosses such as were applied in a separate drilling operation in the FIGS. 14A and 14B version above. These are shown as 1540, 1541, 1542 and 1543.

In this case, a male portion in the mold itself provides a suitable indentation in the part. Since the targets can be so cast, they can be of many other shapes besides simply conical surfaces, holes or other easily machined shapes. For example, cross shapes like the facets of a Phillips screw, which are undeniably discriminate as targets as opposed to other features on the object which can have some resemblance to conical shapes.

It should be noted as shown, that such shapes do not necessarily have to be indented in the part but can be raised such as the equivalent feature 1545 shown sticking up. Such a knob or bump on the part, however, can be in the way of the function of the part and its handling if it is not properly positioned. It is therefore thought since many parts generally have flat surfaces, which are either functional or to simplify handling, that the best means is an indentation in those surfaces which does not interfere with either purpose.

As shown in 16B, a cast or drilled in cone, cross etc. in a surface 1545 into the surface of material 1546, can optionally have a transparent plastic filler material such as 1550 placed into it to cover up a portion or all of the depression or even provide a raised portion sticking out from the surface of 1546.

This plastic material can serve several purposes. One purpose is that it simply protects the surface of the depression from rust and deterioration. This could be quite important in let us say a bright shiny drilled portion on an aluminum or steel part which in time tarnishes or rusts.

A second purpose is that the filler itself makes a different optical element out of the mirror formed by the cone surface (cross etc.) and in this case forms it into a prism which can have use for either spreading the light or directionalizing it.

A third potential reason is that the plastic filler may itself be chosen so as to preferentially reflect light only of certain colors. This then allows another form of discrimination of the targets based on color.

The principal disadvantage of using such a filler is that a separate operation must be made to put the plastic in, which cannot normally be done easily on a machining line. One exception, however, is the process whereby first the reflective hole is drilled into the casting, then plastic is sprayed into the holes very simply, and then a final machining pass required for other purposes is done which in the process shaves the excess material away leaving the plastic flush with the hole surface. This obviously then only adds the spray guns to the process.

Figure 16:
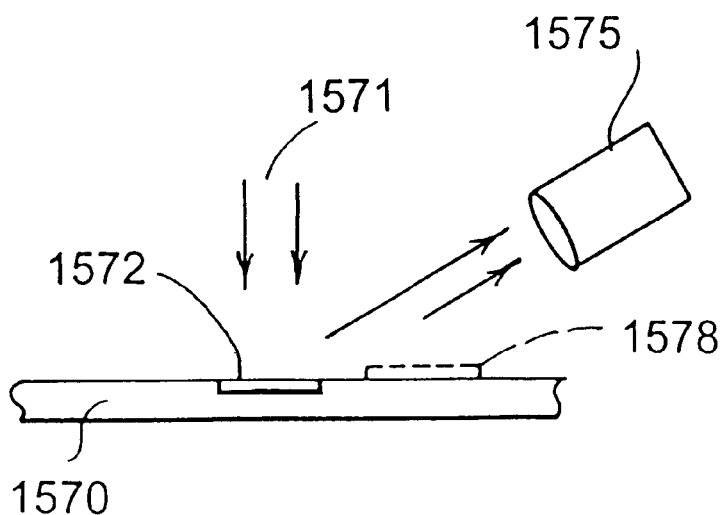

FIG. 16 illustrates another example of targeting, this time on a plastic body panel 1570 illuminated by light field 1571 which is then directed by a target molded into the plastic surface 1572 onto camera 1575. As shown, the target is reflective and is composed of a diffraction grating which directs particular colors or, in general, light of all colors, at angles from the surface. An alternative is that the target 1572 be composed of a multi layer interference elements preferably in plastic which also can direct light at preferential angles in preferential color combinations.

If the camera 1575 is capable, as is a color TV camera, of color sensing as well as spot shape sensing, it can then differentiate these colors and unmistakably identify that such a color spread can come only from such a target. This can be done even in the presence of strong background, as from the surface of object 1570. Such color combinations can also be coded into the targets to identify the part 1570, its angle of orientation etc.

Rather than mold the plastic into the part, it can also be simply glued onto the surface of the part (1578). If a thin reflector film, such as 1578, it may, even though sticking up, be non-interfering with the function of the part. However, for plastic outer body panels in cars, the flush target mounting such as 1572 is preferred. These targets on painting of the car, become covered over. For example, if the targets are on the door panels of the car, which are mounted to the car at the time of painting, their presence is lost once the car is painted. The targets used for such mounting for example, should be flush and create no disturbance with the panel surface once they are painted. It is also noted that targets can be built into objects however to actually be part of the object's appearance. The necessity of covering the target up depends greatly on the aesthetic characteristics of the object.

Another possibility is to utilize targets which are seen as targets only under special illumination which would not normally be present in a human situation. For example, consider target 1572 which could be either molded into the panel or for that matter, simply a portion of the plastic surface of the panel itself treated with a special ultra violet florescent material. Only under ultra violet light would this target portion of the panel actually be visible relative to its surroundings.

This is partly true of the multi layer diffraction case above where the line spacing of the diffraction pattern or the multi layer material and spacing could be chosen such that only under certain colors of illumination, and then perhaps only at certain angles, could the light be strongly seen relative to the surroundings. This then would be particularly easy to arrange if such wavelengths were in the UV or infra red just beyond human vision. The near-IR is an excellent region for sensing with present day solid state cameras for example.

It should be noted that such targets do not necessarily have to be molded in but could be evaporated onto the surface such that the raised amount of material is virtually negligible. Naturally, in crude applications, such applied targets such as 1578 could simply be white crosses of plastic glued on. Clearly, this could be unobjectionable in the final product if in the final painting process there is a wash that simply removes the glue and target. One advantage of the fiber types shown in FIG. 12A, is that the fiber end can be extremely bright and flush to the part surface.

FIG. 17 illustrates another application of the invention, to tracking a carton such as 1579 travelling on a 'car' or carrier conveyor such as 1590. The carton has been randomly placed onto the carrier and it is desired using programmable robotic means to grab the carton and pull it off at a certain station.

To accomplish this, all sides of the carton have printed on target sets of which 1580, 1581 and 1582 are visible in the drawing. These target sets can be of any usable description and remain with the carton always. The beauty of this is that they can be utilized for tracking in the manufacturing plant, and for robotic warehousing purposes and throughout the distribution chain, even for example in a supermarket provide robotic unpacking of the product and place the product on the shelves. Naturally the product packages within the carton, such as let us say egg cartons, or milk cartons, cans etc. can also be targeted for the same purposes since all those have printed on labels or the like.

While each face in this case is shown with four dot type targets, these could clearly be of any number or type. The carton also could be coded to indicate the goods within the carton. In the extreme case, this would require a UPC type codes (e.g. 1591), and indeed a miniature UPC code itself could constitute one or more targets. However, it is considered that most of these would use much less complicated codes since there would normally be no need for such large amounts of information.

It may well be necessary to code the object or targets since all different boxes would have different target spacings due to their own shape and one would first wish to decode which type it was so that the spacing of the targets could be known to the computer of the robot mechanism and fed into the calculations for the various solution of the photogrammetric equations.

For example, it could well be that a special code target might also be used such as 1591 which would include all the photogrammetric solution data for that carton plus an indication of what was inside if desired. The robot camera system could read the code first and from same determine the various target location data on each of the faces of the carton including the target shape and size, the target spacing, how many targets there were and for example the shape of the product itself, whether in a square carton or what have you.

FIG. 18

Figure 18:
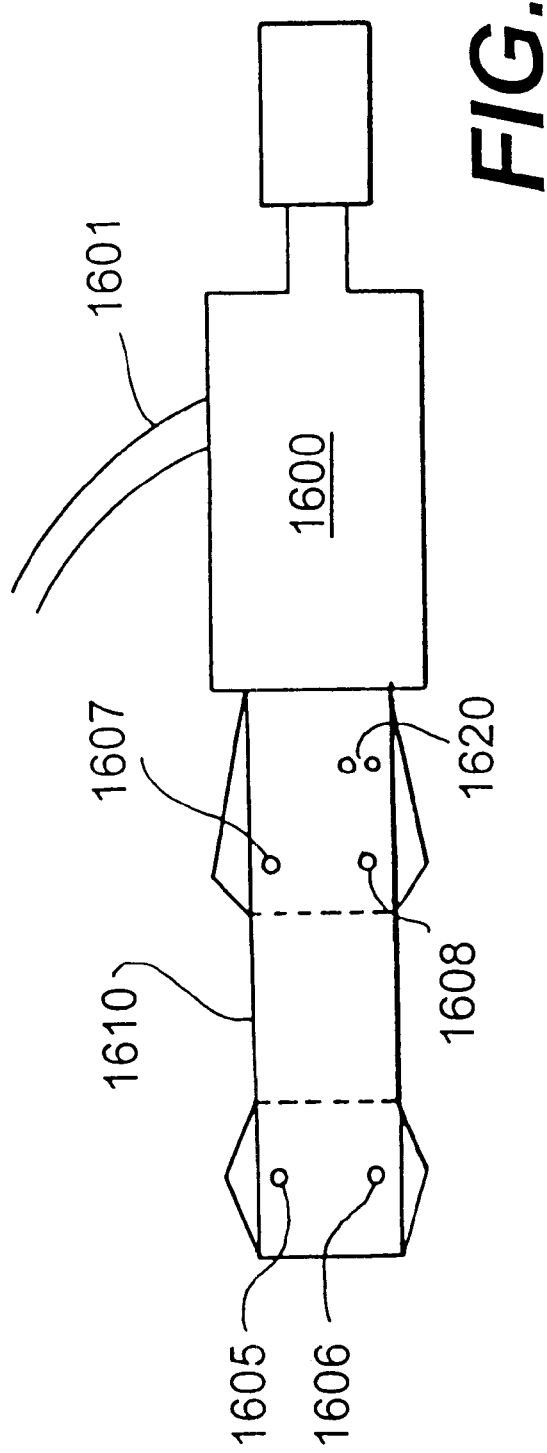
FIG. 18 illustrates means for targeting a tool.

FIG. 18 illustrates a similar concept this time using targeted tools such as the grinder 1600 driven pneumatically via air hose 1601. It is desired that a robot with a gripper come pick this grinder up and do work on an object, for example the leaded-in zones of a car body at the panel junctions.

For this purpose, the tool gripping area 1610 itself is targeted, in this case using light emitting diode targets 1605,

1606, 1607 and 1608, also fed through the umbilical 1601. These diodes can either be on continuously, may be flashed to provide has high signal to noise, or rippled such that only one is on at any given time. The latter is useful if photo sensors responsive only to one point at a time are used such as continuous spot detectors (e.g. UDT SC-10).

Naturally, rather than light emitting diodes at the tool, fibers can be utilized to feed this data to the same points from one or more remote light sources.

The robot hand with camera would approach this tool and via the targets grab the tool at the desired location, in this case, the cylindrical surface 1610 which would be grabbed by 'V' shaped grippers. It is noted that the targets can be placed specifically so they bracket this area and this is a preferred mode of target placement in such instances. However, this is not necessarily required. The targets could be placed such that gripping would be known to the computer to occur in any other location as well.

In this case, it may also be desirable to have a code such as 1620 shown. This code could carry with it the data of where the part is to be gripped, whether it's between the targets or somewhere else, and again, what tool it was and perhaps other data as well.

It is noted that a target such as 1532 and 1531 of FIGS. 15A and 15C, if they project from the object in one or more planes, can allow more accurate solutions of the various pitch and yaw data which are derived from the projected spacing of such targets viewed by the camera. However, the more the target projects from the part in question however, the more the possibility it is objectionable for handling or aesthetic reasons.

FIG. 19

Figure 19:
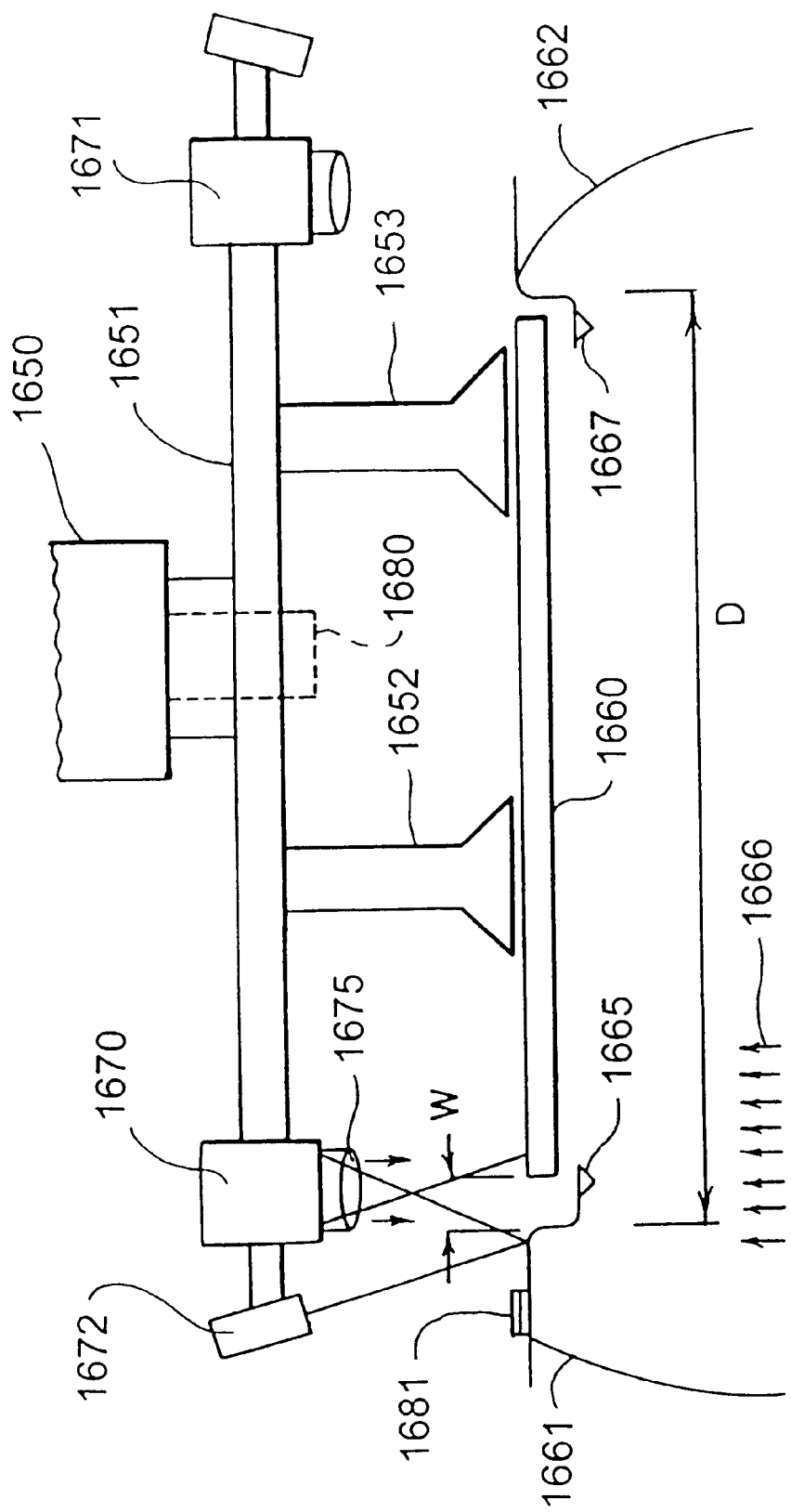
FIG. 19 illustrates alternative means for creating sitable targets, and use on car body assembly.

FIG. 19 illustrates another application of the invention to the assembly of car bodies. In this case, it is desired to assemble a deck lid 1660 onto the body opening formed by two fenders 1661 and 1662 and the other portions of the body not shown for clarity. This problem is very similar to that of fitting the doors in a door opening or the hood in the hood opening and is optimally improved using optical sensing as disclosed.

As shown, a robot arm 1650 carries with it a tooling fixture 1651 containing vacuum cup fixture 1652 and 1653 which attach to the deck lid 1660 to be put on. The fixture itself contains optical sensors, in this case 1670 and 1671 which are used in the mode shown here tracking targets as well as to measure certain variables of the part itself using concepts shown in the referenced applications.

Such applicable sensors are shown in reference nos. 6, 16, and others.

As the robot approaches the car body containing the fenders carrying with it the deck lid 1660, sensors 1670 and 1671, which contain linear or matrix camera units, have determined the position of the deck lid relative to the cameras themselves. In other words, the cups 1652 and 1653 can pick up this deck lid in a relatively random fashion from let us say a roller conveyor and have the cameras compensate the robot for this random position by sensing the edges of the deck lid. Alternatively, the sensors can sense the deck lid edges ideally and cause the pickup to be made in the correction location. It is likely too that other cameras would be located on the other sides of the part, for example, as shown as 1680 (dotted lines).

When the robot is relatively far away from the body, the camera unit which also contains for example illumination source 1675, picks up the reflected image of a stamped in cone targets such as 1665 into the fender. Alternatively, for even better contrast, a hole 1665 can be provided, back illuminated if possible by a light source such as 1666. Unfortunately, however, in most portions of panels, extraneous holes are not desired. Such stamped in targets are however extremely possible and can be accomplished just as in the case of the cast in targets of FIGS. 15A and 15C in an analogous manner. The fiber based targeting systems are ideal if they can be employed economically.

As the sensing of targets such as 1665, and 1667 on the opposite side, as well as other targets around the rest of the periphery of the deck opening, allow the robot system to home in on the body. Note that unlike previous embodiments, it is not a single camera which is seeing all targets, but the ensemble of two or more cameras whose combined target data gives the position and orientation to the part. As the camera sensor unit comes in for its final approach, an oblique light projector unit such as 1672 illuminates the portion of the part itself from which a triangulation data as to the exact range to the fender 1661 can be provided at a higher resolution. Such a sensor unit incorporating this has been shown in reference no. 6 and other references.

As the part then fits into the opening 'D', the gap width 'W' on each side is sensed by each of the cameras on the four sides and optimized for the car body in question. When the deck is optimally positioned, then various hinge screws and bolts are run down to lock it into place. This process therefore not only generates a fully automated deck (or door) placement, but also creates a optimal body fit for highest quality performance. This operation does not necessarily require the use of the targets and can be done in a targetless fashion particularly if the body is stopped when this is occurring. If the body is however in motion, the target data definitely is very much desirable such that its side to side and forward/backward oscillations can be tracked on the approach.

It may also be required that two sets of camera magnifications be used, one at high magnification to determine the distance 'w' and one at lower magnification to track the targets. This depends on the application and naturally is not as desirable as just a single unil Further, in this case the targets are shown being covered up by the panel, in other words, they are out of sight in terms of the body itself. This can be true in both doors, decks and so on. Some of the tracking however could be done by targets which were visible on other portions of the body and not covered. This would allow the targets to be tracked even at the time of actual panel insertion and bolting which would be desirable on moving parts. For this purpose, it is thought special targets should be stuck onto the body such as target 1681 shown which has been stuck onto the fender and is, for example, comprised by a white background with a cross on it. Such targets might be viewed by a completely separate camera system mounted to the side or overhead or on the robot arm 1650 itself rather than on the tooling.

It should be noted that in any of the above embodiments, targets should be as distinct as possible. If possible, certain types of reflective target material such as plastic retro reflectors and retro reflective tapes can be of extreme interest as long as they can be placed on the object in a manner that does not ruin its function. Such tapes and targets, therefore, are best suited for use on objects which do not have an aesthetic purpose and some of these would certainly be all conveyor parts, cartons etc. The problem, however, with these targets is that they are generally of materials which must be attached and this can cause difficulties in terms of both the cost of attaching the targets in an accurate manner (remembering that for best operation, with multi target systems, the target spacing and orientation needs to be known, such that the photogrammetric calculations can be accurately solved. The second problem with these materials is that they are often plastic and in some cases, plastic will not survive the remainder of the process whether it be hot washes, heat treat, or what have you.

It should also be noted that targets, when applied can be removed for use on subsequent parts. For example, retro reflective glass targets of very high contrast can be screwed into tapped holes on the part at very well known locations and screwed off later on and used again. This would be easily accomplished for example, on the cylinder head of FIGS. 14A and 14B if the tapped rocker cover rail holes for the rocker cover were utilized to carry the targets which were screwed into those holes, preferably automatically. At the final rocker cover installation, these screws would be taken out and the rocker cover bolts put in. Naturally, however, this adds two operations, screwing in, and screwing out, to the process but it does utilize the same holes that are put into the part anyway. Other targets could be attached with glues etc. which could be taken off the part with solvent and off the target such that it could be reused again after cleaning. This is discussed relative to FIG. 20.

In addition to the above ideas, there are several other continuations from the previous application that should be noticed. For example, FIG. 8 of Ser. No. 200,401 discloses instrumented grippers with fiber optic sensor units including a triangulation projection source to which allows three axes of data to be obtained. It is noted herein that up to five axes of such data can be obtained using projection of multiple beams or four beams to get four or five axes of data. This allows the pitch and the yaw of the part to be obtained as well as the range, plus the xy image and is further described relative to FIG. 22 below.

It is noted that the robot arm may be instrumented for guidance with such a sensor either using LED or diode lasers as targets or via fibers. Such concepts of guiding robots with external cameras using targeted arms has been shown in the copending application of reference no. 17.

Color discrimination of the various targets can be made by using color TV cameras or with simply a color sensor in front of a detector if applicable. For example, relative to background levels, if all targets are infra red emitting such as infra red LEDs, then an infra red, band pass filter can be placed in front of the camera such that greatly discriminates against the white light image background and shows primarily the infra red targets superposed thereon.

Furthermore, the holes put onto cylinder head in FIGS. 14A and 14B can be more than just conical, they can be actually be drilled in deeper such that they tend to absorb all light. In this case, one would look at the angle of reflection from the bright machined face of the rocker cover rail and the target holes would show dark It should be noted in FIG. 15B, a blob of plastic or a blob of silicone could be put on top of the part to act as a target Indeed, if a linear strip of silicone for example were utilized, this would approximate the fiber arrangements shown in FIG. 12A or 13 and indeed light can be transmitted through and around the part illuminating edges of it thereby.

FIG. 20

Figure 20:
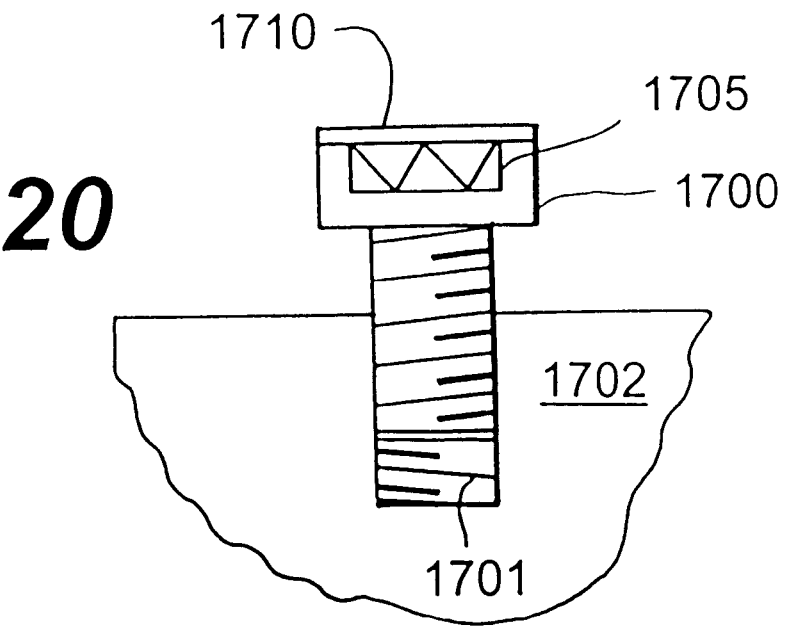
FIG. 20 illustrates reusable targets for parts.

FIG. 20 illustrates one example of a reusable target, in this case, a special screw 1700 which is screwed into a threaded hole 1701 in a part 1702 such as the cylinder head of FIG. 15, engine block or for that matter just about any machined part that has a threaded hole. These threaded holes would as has been pointed out, be almost certainly holes that already exist on the part for other purposes and as for assembly with the target part taking the place of the regular part up until the point of final assembly when it would be removed.

The target screw is built like a socketed cap screw but instead of the socket hole, in this case, being at least partly filled with a retroreflective target 1705, which is ideally comprised of plastic or glass retroreflective material for example that commonly used on automotive reflectors or specialized types built by 3M and other companies.

If desired, a color filter such as 1710 can be utilized on top of this screw or as part of the retroreflector to give a preferential color signal from this particular bolt or stud if it is desired to distinguish it against others. The reflector design itself may also provide such distinction being multi-pointed or what have you.

This particular arrangement provides an extremely high target delineation, and allows the targets to stand outward from the part surface if desired (as for better photogrammetric solution purposes) by simply having a long threaded length. Furthermore, this stud is a relatively low cost item and can use automatic lines to put in and take out. The only disadvantage of course is that it must go into a hole that is later used which means in the final assembly process, the target cannot be used unless the part is not moved during assembly after the target is taken out.

While a screw type has been shown, it is clear that other arrangements such as bayonet, snap in/snap out, or other targets could be utilized which could be removed with special tools from otherwise clear holes which later would accept trim strips, rivets or what have you.

In other cases, the target itself might simply have a pointed end such as a pin which could be stuck into the object material and later removed leaving a hole which would cover itself over if the material was relatively compliant. This could include, for example, seat materials or meat on overhead conveyor lines where the carcass itself could have targets put in it.

FIG. 21

Figure 21:
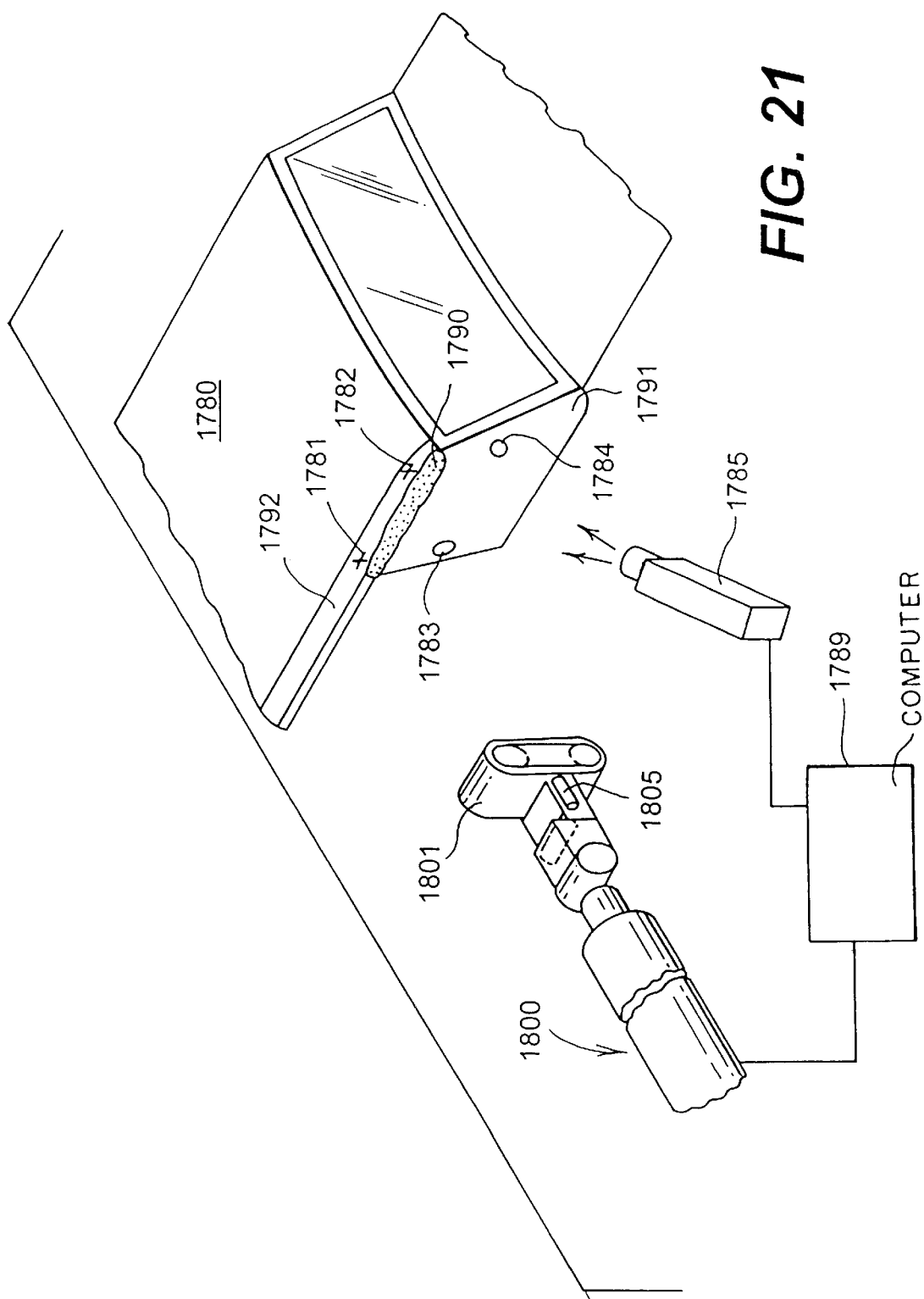
FIG. 21 illustrates a method of assembling cars according to the invention.

FIG. 21 illustrates an application of the invention to working on a continuously moving car body assembly 1780. In this case, a robotic system according to the invention is provided complete with camera system 1785 which locks onto the body targeted with reflective targets 1781–1784 in the working region causing the robot to track the motion of the car body side to side, backward and forward on the body "truck" (not shown).

The sensor unit 1785, in conjunction with robot control computer 1789, controls the robot arm 1800 to move an abrasive belt grinder 1801 to grind out the lead 1790 fill-in between the sail panel 1791 and the roof panel 1792. There are two forms of additional optical sensor units of use in this embodiment. The first is 1805, such as FIG. 16 of the referenced application which allows the attitude of the belt grinder to the surface of the body to be determined for tracking purposes. The second (not shown) is a contouring sensor such as FIG. 4F of Ref. No. 16 which contours the leaded zone of the body to feed back contour coordinates to the grinder and update the amount of metal left on and judge whether or not further grinding should occur and if so, from what angle (determined in conjunction with the dynamic tracking data at low resolution from the target sensor 1785, and at high resolution from the on-board sensor 1805).

Utilizing all three of the optical separate sensor systems plus force feedback, a complete grinding cell so to speak can operable on-the-fly. If the car can be stopped in its motion, the target based system is not as much required for tracking the gross motions of the body and the other two sensor systems are sufficient. However, the target system is a good "insurance" for rapid approach.

In the above application, considerable amounts of specialized hardware are of use, much of which has been discussed in the referenced applications. For example, camera units are best provided by solid state matrix arrays such as the GE TN2500 and the new solid state TV color arrays now appearing on the market by Sony and others.

In terms of light sources, flashed Xenon light sources are very good for illuminating targets with brilliant high signal to noise pulses, even when color filters are applied. Also, such flashes do not cause the solid state cameras to bloom, a desirable advantage.

Desirable laser light sources include diode lasers operating in the infra red made by RCA and Laser Diode Laboratories. Of interest too is the Mitsubishi 4001 laser diode which is partially visible.

The high powered infra-ed LEDs such as the Texas Instrument types can also be utilized for such illumination through fibers or what have you. LEDs are very convenient in that they are low power consumption and can be modulated as can the current range of diode lasers.

The approach described relative to FIGS. 12A and 13 holds for all kinds of other parts such as tires, parts of aircraft, furniture, just about any part where some sort of method of casting, molding or otherwise placing fibers into the part can be done. Even metal parts can have integral fibers if they can stand the melting temperature (e.g. quartz fibers).

It should also be noted that the part does not necessarily have to have fibers cast or molded in. One can also have a fiber placed onto this part, for example, glued to the part around its periphery or at specific points. These are then illuminated and can then be used for the same robotic and other purposes as shown above.

This gluing operation, however, generally requires additional labor, either human or robotic, although it could be done on an automatic in-line machine as well.

It should be noted that while fiber optics have been discussed as the light carrying medium, it is clear that a transparent silicon bead laid down on a part is also light transmitting although less so. This particular use of fibers and other light transmitting mediums applied into or onto parts is particularly appealing for many applications where they are to be substantially robotically handled and, therefore, where the cost of applying the fibers in and illuminating them at different stations is made up by savings due to reduced complexity of robotic automation utilized.

The application of such concepts to things such as tooling was discussed in my recent copending application (ref no. 6) on robotic casting inspection, where sensors were in the tools to sense part condition. This disclosure has expanded on this to provide fiber illumination of tool location to allow handling or size determination of tools. This is also related to a copending application entitled "Method and Apparatus for Detecting Wear or Breakage in Tools". Suffice it to say that tools can also be illuminated like the J-hook of FIG. 8, to provide meaningful indicators or targets to allow pick up by robots or other automation. One can consider such tools as cutting tools, small drills, routers, pneumatic wrenches, saws, lasers, weld heads etc. All can be instrumented in this manner. Even small things such as sockets for wrenches can be so instrumented.

Note that 'light' in this application refers to all wavelengths of electro-magnetic radiation IR through UV.

Similar fiber optic emitter targets can be the grippers or arm robots themselves, replacing LEDs or other types on the grippers such as shown in copending application entitled "Electro-Optical System for Control of Robots, Manipulator Arms and Coordinate Measurement Machines".

Suitable fibers include, at the low end of cost, the Dupont Corfon plastic fibers as well as glass fibers made by American Optical, Corning and numerous other manufacturers.

It should be noted that image transmissive bundles can be utilized to remote the images of sensors shown in this application as has been shown in the referenced copending application which this application is a continuation in part. Such fiber optic bundles are made by Nippon Sheet Glass, Olympus and others and can have very high resolution.

It is noted that image scanning photo detector camera arrays and solid state TV (matrix array) cameras, while preferred, are not the only means of viewing the targets of this invention. Other TV cameras can be used, as can in some incidences scanning laser beams or even fixed detectors optimized for a preferred target signature. Continuous or quadrant position detectors (such as UDT SC-10's) can be used as well to determine the image position of a single spot or target at a time.

Figure 22:
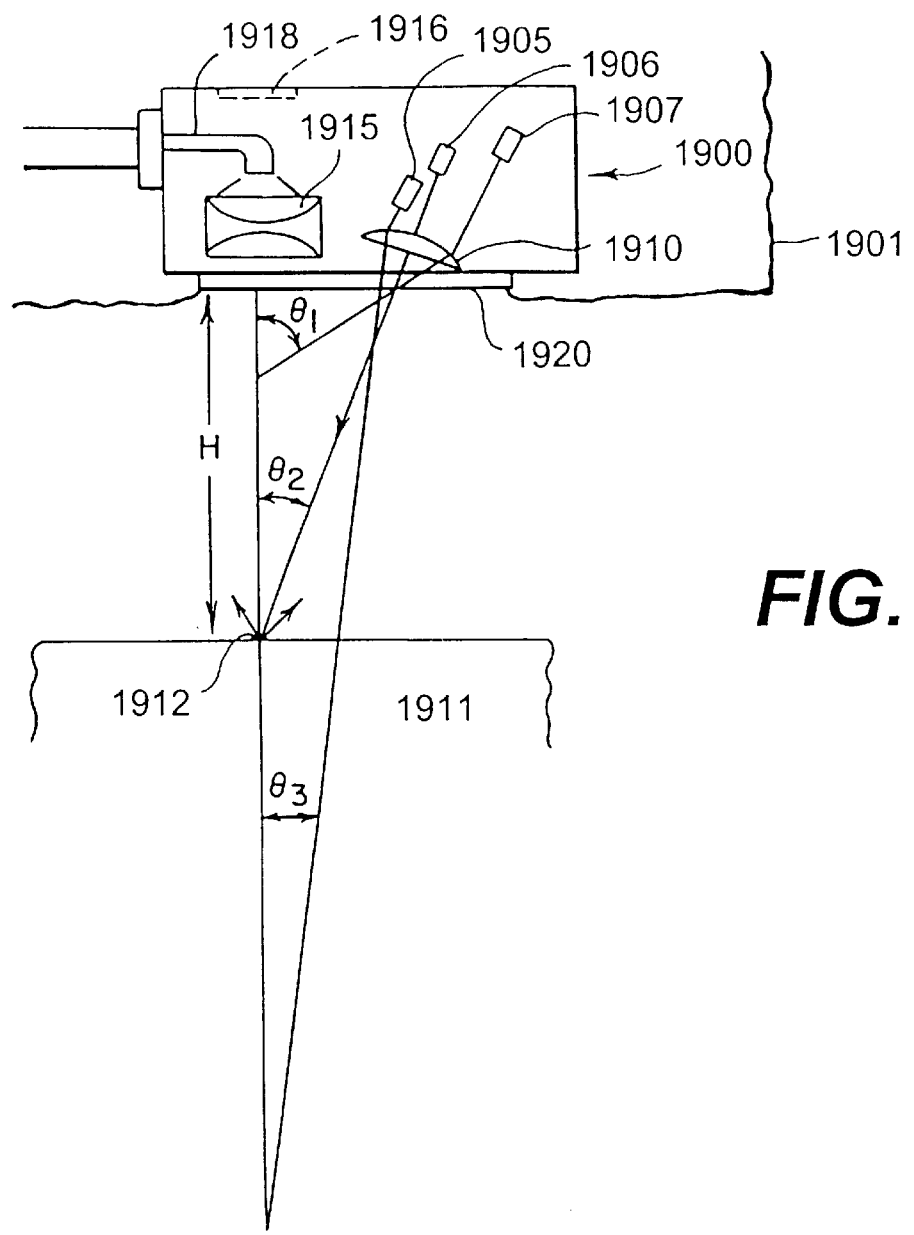
FIG. 22 illustrates a sensor embodiment according to the invention.

Shown in FIG. 22 is a sensor according to the invention providing an improvement on some of the fiber optically based sensors of the co-pending application Ser. No. 200,401. This particular sensor shown is a multi range sensor of unique small size according to the invention which in this case is shown being so small that it can be built into the grippers of robots. It does not require targeted objects, but can be combined with other embodiments to work in conjunction with targets as well.

As shown sensor 1900, located in this case in one half of the gripper portion 1901 of a robot end effector is comprised of light sources 1905, 1906 and 1907. (In this example there are three light sources although there could be any number.) These light sources are diode lasers or in many desirable instances, they are 0.005 optical fibers remotely connected to diode lasers with only the fibers brought to the sensor.

In any case, light from each of the fibers is focussed by single lens 1910. However, due to the variation of positioning of the fibers, the light is focussed at different distances and at different angles depending on the position of the fiber. This is ideal for providing a multi range, multi resolution sensor, with highest included angle and resolution at the shortest ranges as is desired for accurate part pick-up and other purposes.

Light source 1906 is focussses at the nominal range to the part 1911 shown in the drawing forming a reflected spot 1912. This spot is, as has been described in many copending applications, imaged by lens 1915 onto an integral photo detector array 1916 (dotted lines). However, in this case, again for compactness, the image is formed onto a coherent fiber optic bundle 1918 and carried to a remoted matrix photo diode array. Thus, in this example, all light sources and sensing can be done over fibers if desired. This is attractive for thermal and electrical isolation purposes, plus light weight on small robots.

A suitable window, 1920 is provided in front of the sensor housing.

The other two light sources, 1905 and 1907, on either side of the nominal, focus at different distances and at different angles. The larger the included angle theta, the more the resolution. Therefore, it can be seen as the image forming capability associated with 1907 is at the highest resolution with the part closest and this is used for the fine approach of the sensor where the range 'H' might be only half an inch. In the case of 1905, 'H' might be set up for 10 inches.

Obviously, this sort of an arrangement is fine for maintaining a reasonable focus of light sources at different ranges. However, with a single lens 1915 one needs a narrow aperture to give large depth of field and maintain the spots projected in reasonable focus over a wide range of object locations. Alternatively, a zoom lens 1915 can be used to maintain focus over the range.

Since spot centroids are being measured, it is noted the spot image can be somewhat out of focus and still be utilized (see reference no. 6 or no. 8 for suitable circuit processing). Optional white light sources can also be used with this arrangement to provide a edge image lighting with the part 1911.

It is further noted relative to FIG. 22 that each diode laser or fiber could be focused by an individual lens. While more complicated, this allows more angular spread between beams. It is contemplated that only one beam would be turned on at once, suitable for the range in question. However, even if more than one were on simultaneously only one is generally in the field of view of lens 1910 at a time. If there are two in the field, they can be discerned from their location. Indeed, two divergent beams can be projected on purpose at once in the field, one to determine range and the other to give angular orientation from the beam separation on the target, knowing range.

It is further noted that this invention is very useful to control robotically positioned non-contact processes such as laser welding, drilling etc. especially on continuous lines. In terms of processes in general, the invention applies to welding, drilling, grinding, cutting, hardening, and any other material removal, addition on transformation process.

The characteristics of targets used in this invention generally include distinctive shape, light reflection, light transmission or light emission characteristics relative to the normal surface of the object targeted. Where the 'normal' object has targets, a better definition is relative to the rest of the object surface, i.e. the untargeted remaining portion. Light emission, reflection or transmission can be distinctive in color, direction, distribution of direction or color, shape, and intensity.

In the case of the fiber version and other active targets, the targets can also be diverse in their light modulation frequency.

It is noted in the application of the invention to practical plant problems, that photodetector arrays are much preferred over the analog tube based TV cameras used by Pinkney and other photogrammatists. Particularly photodiode arrays such as the GE TV2500 do not require frequent calibration and therefore can be relied on much more to give accurate dimensional data as to target or spot location. For example, a TV tube drift of 3% in the apparatus of Pinkney et al can create a generally intolerable error of 0.3" at 10" standoff in the range data alone. The arrays used in this invention preclude this possibility.

It is further noted that in the embodiments shown herein relative to continuous conveyors, if conveyor speed is known, the tracking requirements are reduced accordingly.

It is also noted that the snubber rails 1250 and 1251 are but one example of means to constrain motion or velocity in one or more axes of an object in this invention. It may also be useful to constrain velocity for example using electro magnetic or viscous fluid damping. Constraints of this sort generally make the total robotic handling or parts working system easier to control.

This disclosure has described many ways of adding targets to objects. Other ways of making the target part of the object have also been described Where the object is one which is in it final form and located in a position that it can be seen by a consumer who expects it to provide a pleasing appearance, there is considerable requirement to make the targets used in the invention either essentially invisible or alternatively make them have aesthetic value of their own.

For example, a doped target zone of a plastic dashboard piece can fluoresce under UV light but remain invisible in normal illumination.

Alternatively, a portion of the object may contain a special dopant to cause it to reflect or absorb in the IR more than normal.

A desirable condition exists if one can make the targets part of the overall design to provide for example a pleasing accent feature which are viewed as part of the design. Where possible the targets can also be functional features such as holes, knobs etc.

For multi-target application involving three, four, or more targets (to provide maximum solution capability of the photogrammetric equations) it is noted that the targets do not have to be equi distant or otherwise or rigidly arrayed in their relation. Thus a variety of aesthetic possibilities exist. For example:

On rectangular parts, the four corners are desirable where targets can be squares, circles or other shapes.

On circular parts or sections thereof, the four targets 90° are desirable or three targets 120°.

On irregular parts, the targets can be in any logical arrangement

Figure 23A:
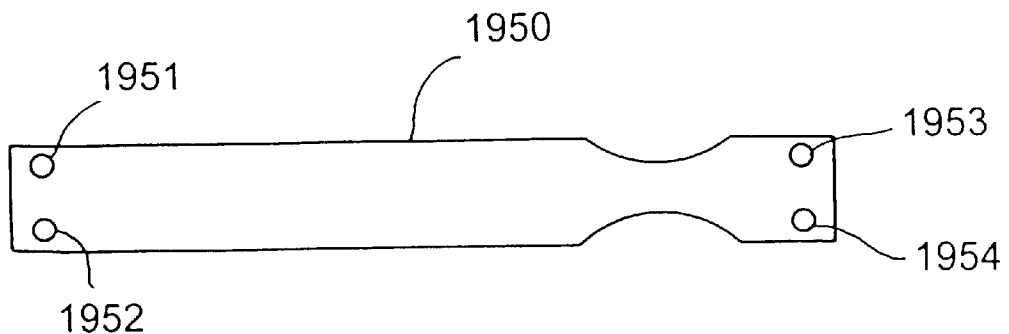
FIGS. 23A, 23B, 23C and 24 illustrate further part targeting embodiments.
Figure 23B:
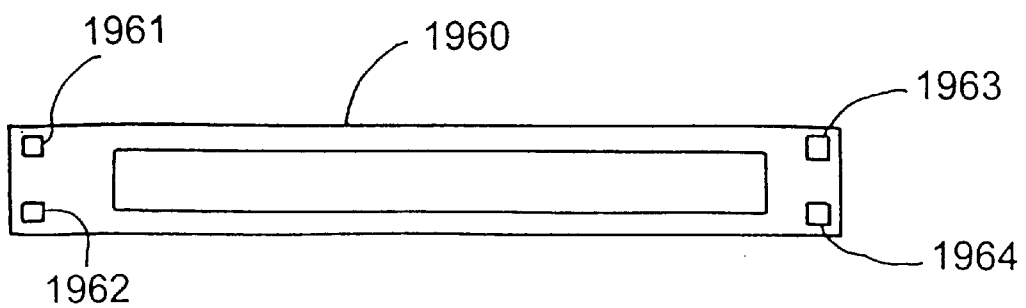
Figure 23C:
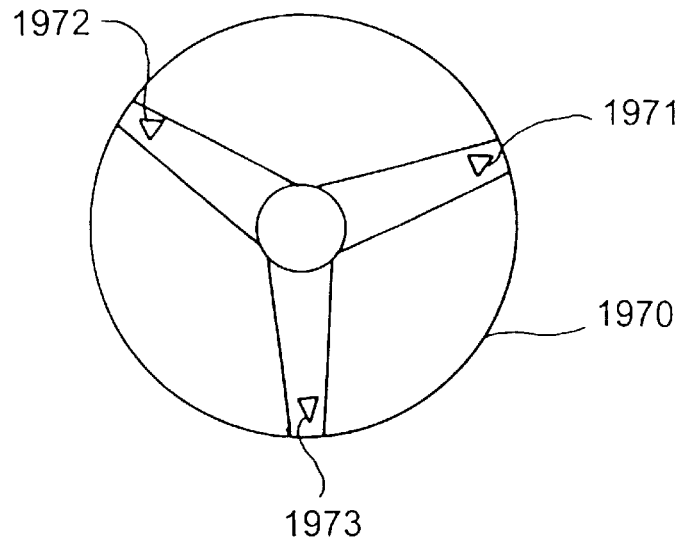

Examples are:

a furniture leg 1950 with round head tacks 1951–1955 at corners serving as targets (FIG. 23A)

automobile grills 1960 with decorative square target fascets 1961–1965 or slots near the corners (FIG. 23B)

automobile steering wheels 1970 with triangular bright inserts 1971–1973 in outer edge of three 120° spokes (FIG. 23C)

It is also noted that within the target slots 1241 etc. of FIG. 11, transmissive diffraction gratings and other preferential diffusers of transmitted light can be located.

It is further noted that light from the fiber end 1020 for example need not necessarily be imaged by lens 1040, but can be detected directly by one or more detectors.

It is noted that in many plant applications where the targeted object goes through many processes or are repetitively used (e.g. the conveyor carriers of FIG. 10), that the targets can degrade or be knocked off, destroyed etc. Thus it is desirable in many cases to have a superfluous number of targets.

Since only three targets are needed for a complete photogrammetric six axis solution (and even two will do if certain aforementioned constraints are used), two or three is then the base number of targets per object generally desirable. In many cases, a fourth target is desirable to provide a redundant solution however.

This invention therefore considers the purposeful addition of extra targets also in known locations relative to the two to four basic targets and for the additional step of determining which targets are present and using an optimal solution for those.

Figure 24:
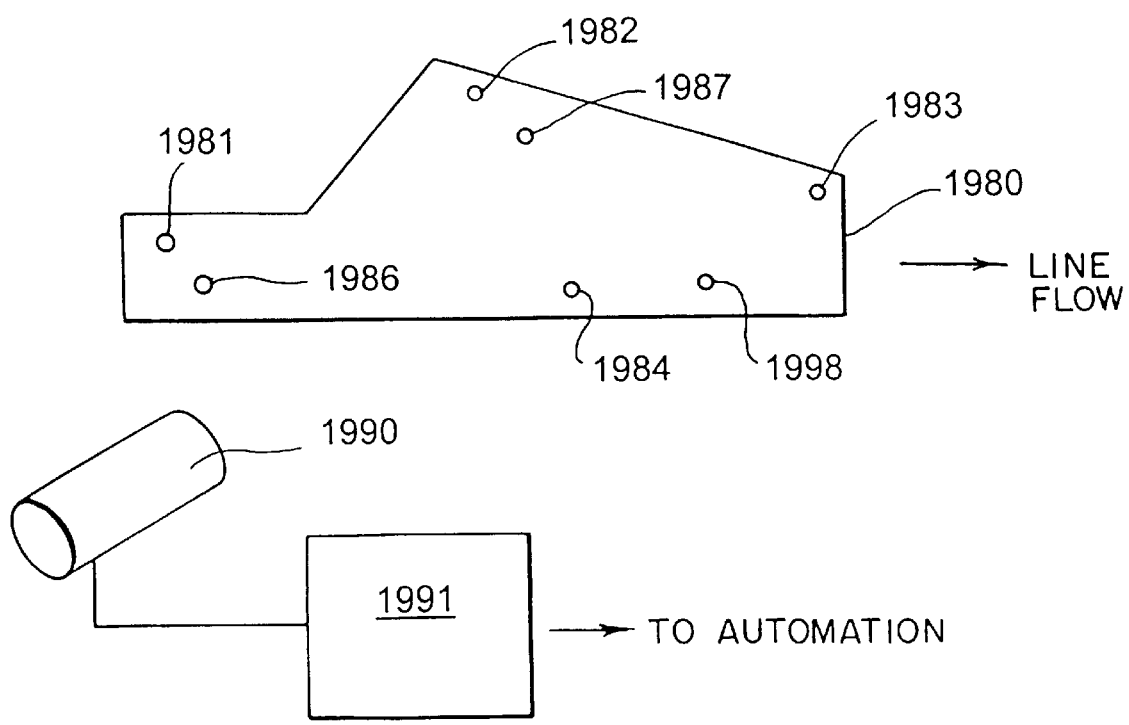

Consider FIG. 24. Illustrated is a conveyor pallet 1980 used repeatedly in a plant equipped with targets 1981–1984 and extra redundant targets 1986–1988. In one mode of operation, normally camera 1990 and computer 1991 are programmed top consider only targets 1981–1985. If, however, one of these targets is missing, the images of target- 1986, 1987 or 1988 is utilized. In general the rationale is to use the remaining target closest to the missing one but the best rationale is to use whatever target combination gives the best solution (i.e. most accurate) of the photogrammetric equations.

It is contemplated that certain additional targets might also be applied to provide, in certain instances, more accurate solutions for example, to pitch or yaw variables in the plane perpendicular to the lens axis. For example, one might choose at certain stations in the line where a higher degree of sensing in one or two of the variables were desired, to use target 1988 on purpose, instead of 1985 say.

Naturally, if all targets but three are damaged, one uses the remaining three regardless. However, the invention can include the additional step of signaling a control that pallet SN 1368 say is down to its last four targets and should be repaired.

It is further noted that a system input or verification station is often desirable in a system such as shown in FIG. 10.

For example, consider providing sensor 1262 at a position where the conveyor carrier is well positioned such that the targets can be checked for presence and their locations verified if desired. Not only is this helpful in keeping the system in control, but if each carrier was serialized or sequenced the actual target location can be measured at this station and the locations stored in a computer, such as 1280, relative to the carrier in question. This allows different carriers of different parts in different states of repair to be intermixed on the same line with no loss of target position accuracy. This is important since the accuracy of the solution of photogrammetric equations (used to guide the robots on the line such as at the station of FIG. 10) is based on the degree of accuracy with which the relative location of the targets to themselves and to the carrier body is known.

Only one such verification station (which could also have a carrier serial code reader as could the station of FIG. 10) is required per line. It also, as has been mentioned, helps monitor damaged carriers and damaged carriers could then be automatically routed off-line for repair.

Note that verification station can also be used for parts when they are in a fixtures or otherwise known correct position at some point in a line. Any missing targets as well as locations can be verified before they enter the system.

This invention will be useful in a wide range of applications and it is envisioned that a standard sensor computer unit can be built essentially independent of the application.

The user would only need type in or otherwise enter data into the computer such as 1280, to tell the system the pertinent target location and spacings on the parts or objects to be handled, assembled, or worked. Thus it can be reprogrammed to different parts, lines etc. and forms the basis of a generalized robot control system.

I claim:

1. A method for determining the location of a target provided on an object, said target being reflective of radiation outside of the visible wavelengths, said method comprising:

providing on an object a special target which reflects infra red radiation;

illuminating said object with infra red radiation projected from an infra red radiation source;

electro-optically detecting infra red radiation reflected from the infra red radiation source which is reflected from said target with an electro-optical sensing means, said electro-optical sensing means having an output; and processing an output of said electro-optical sensing means to determine the location of said target.

2. A method according to claim 1, wherein said target is a retro-reflecfive target and said target is illuminated by said infra red radiation source on an axis substantially parallel to the axis on which reflected radiation is detected by said electro-optical sensing means.

3. A method according to claim 1, wherein said infra red radiation is detected with an electro-optical sensing means comprising a photodetector array.

4. A method according to claim 1, wherein a microcomputer is used for said processing.

5. A method according to claim 1, wherein said projecting step illuminates all of the object facing the IR radiation source with the IR radiation.

6. A method according to claim 1, wherein said IR radiation source is an LED.

* * * * *